US012731481B2

(12) United States Patent
Brown et al.

(10) Patent No.: US 12,731,481 B2
(45) Date of Patent: Sep. 8, 2026

(54) PROXIMITY-SENSOR SUPPORTING MULTIPLE APPLICATION SERVICES

(71) Applicant: Proxense, LLC, Bend, OR (US)

(72) Inventors: David L. Brown, Chattanooga, TN (US); John J. Giobbi, Bend, OR (US)

(73) Assignee: Proxense, LLC, Bend, OR (US)

(*) Notice: Subject to any disclaimer, the term of this patent is extended or adjusted under 35 U.S.C. 154(b) by 0 days.

(21) Appl. No.: 18/747,258

(22) Filed: Jun. 18, 2024

(65) Prior Publication Data

US 2024/0339028 A1 Oct. 10, 2024

Related U.S. Application Data

(63) Continuation of application No. 18/150,441, filed on Jan. 5, 2023, now Pat. No. 12,033,494, which is a continuation of application No. 16/997,590, filed on Aug. 19, 2020, now Pat. No. 11,562,644, which is a continuation of application No. 15/643,734, filed on Jul. 7, 2017, now Pat. No. 10,769,939, which is a (Continued)

(51) Int. Cl.

| | |
|---|---|
| ***G08C 17/02*** | (2006.01) |
| ***G06F 21/32*** | (2013.01) |
| ***G06F 21/35*** | (2013.01) |
| ***G06F 21/62*** | (2013.01) |

(52) U.S. Cl.

CPC ............. *G08C 17/02* (2013.01); *G06F 21/32* (2013.01); *G06F 21/35* (2013.01); *G06F 21/629* (2013.01); *G06F 2221/2111* (2013.01)

(58) Field of Classification Search

CPC ......... G08C 17/02; G06F 21/32; G06F 21/35; G06F 21/629; G06F 2221/2111

See application file for complete search history.

(56) References Cited

U.S. PATENT DOCUMENTS

| | | | |
|---|---|---|---|
| 3,665,313 | A | 5/1972 | Trent |
| 3,739,329 | A | 6/1973 | Lester |

(Continued)

FOREIGN PATENT DOCUMENTS

| | | | |
|---|---|---|---|
| EP | 1478152 | A2 | 11/2004 |
| EP | 1536306 | A1 | 6/2005 |

(Continued)

OTHER PUBLICATIONS

Farouk et al., "Authentication Mechanisms in Grid Computing Environment: Comparative Study," IEEE, Oct. 2012, p. 1-6.

(Continued)

*Primary Examiner* — Curtis J King

(74) *Attorney, Agent, or Firm* — Patent Law Works, LLP

(57) ABSTRACT

A personal digital key (e.g., which can be carried by a human) contains a memory having different service blocks. Each service block is accessible by a corresponding service block access key. As the personal digital key (PDK) moves around, it is detected by sensors. The sensors report position data, thus enabling location tracking of the PDK. The sensors also provide a data path to various applications. An application that has access to a service block access key can therefore access the corresponding service block on the PDK. The sensors themselves may also contain service block access keys.

20 Claims, 9 Drawing Sheets

Related U.S. Application Data continuation of application No. 14/185,877, filed on Feb. 20, 2014, now Pat. No. 9,728,080, which is a continuation of application No. 12/268,397, filed on Nov. 10, 2008, now Pat. No. 8,659,427.

(60) Provisional application No. 61/080,916, filed on Jul. 15, 2008, provisional application No. 60/986,939, filed on Nov. 9, 2007.

(56) References Cited

U.S. PATENT DOCUMENTS 3,761,883 A 9/1973 Alvarez et al.
3,906,166 A 9/1975 Cooper et al.
4,101,873 A 7/1978 Anderson et al.
4,430,705 A 2/1984 Cannavino et al.
4,476,469 A 10/1984 Lander
4,598,272 A 7/1986 Cox
4,661,821 A 4/1987 Smith
4,736,094 A * 4/1988 Yoshida ............. G06Q 20/3572 235/487
4,759,060 A 7/1988 Hayashi et al.
4,814,742 A 3/1989 Morita et al.
4,871,997 A 10/1989 Adriaenssens et al.
4,993,068 A 2/1991 Piosenka et al.
5,043,702 A 8/1991 Kuo
5,052,049 A 9/1991 Andros et al.
5,187,352 A 2/1993 Blair et al.
5,212,369 A * 5/1993 Karlisch .............. G06Q 20/341 235/487
5,224,164 A 6/1993 Elsner
5,296,641 A 3/1994 Stelzel
5,307,349 A 4/1994 Shloss et al.
5,317,572 A 5/1994 Satoh
5,325,285 A 6/1994 Araki
5,392,287 A 2/1995 Tiedemann et al.
5,392,433 A 2/1995 Hammersley et al.
5,410,588 A 4/1995 Ito
5,416,780 A 5/1995 Patel
5,422,632 A 6/1995 Bucholtz et al.
5,428,684 A 6/1995 Akiyama et al.
5,450,489 A 9/1995 Ostrover et al.
5,473,690 A 12/1995 Grimonprez et al.
5,481,265 A 1/1996 Russell
5,506,863 A 4/1996 Meidan et al.
5,517,502 A 5/1996 Bestler et al.
5,530,232 A * 6/1996 Taylor .................... G06Q 20/20 235/487
5,541,583 A 7/1996 Mandelbaum
5,544,321 A 8/1996 Theimer et al.
5,552,776 A 9/1996 Wade et al.
5,563,947 A 10/1996 Kikinis
5,578,808 A * 11/1996 Taylor .................. G06Q 20/363 235/440
5,589,838 A 12/1996 Mcewan
5,594,227 A * 1/1997 Deo ...................... G07F 7/1083 902/4
5,598,474 A 1/1997 Johnson
5,611,050 A 3/1997 Theimer et al.
5,615,277 A 3/1997 Hoffman
5,619,251 A 4/1997 Kuroiwa et al.
5,623,552 A 4/1997 Lane
5,629,980 A 5/1997 Stefik et al.
5,644,354 A 7/1997 Thompson et al.
5,666,412 A 9/1997 Handelman et al.
5,689,529 A 11/1997 Johnson
5,692,049 A 11/1997 Johnson et al.
5,708,423 A 1/1998 Ghaffari et al.
5,719,387 A 2/1998 Fujioka
5,729,237 A 3/1998 Webb
5,760,705 A 6/1998 Glessner et al.
5,760,744 A 6/1998 Sauer
5,773,954 A 6/1998 Vanhorn
5,784,464 A 7/1998 Akiyama et al.
5,799,085 A 8/1998 Shona
5,821,854 A * 10/1998 Dorinski ............... G06F 21/554 340/10.5
5,825,876 A 10/1998 Peterson, Jr.
5,835,595 A 11/1998 Fraser et al.
5,838,306 A 11/1998 O'Connor et al.
5,854,891 A 12/1998 Postlewaite et al.
5,857,020 A 1/1999 Peterson, Jr.
5,886,634 A 3/1999 Muhme
5,892,825 A 4/1999 Mages et al.
5,892,900 A 4/1999 Ginter et al.
5,894,551 A 4/1999 Huggins et al.
5,898,880 A 4/1999 Ryu
5,910,776 A 6/1999 Black
5,917,913 A 6/1999 Wang
5,923,757 A 7/1999 Hocker et al.
5,928,327 A 7/1999 Wang et al.
5,942,985 A 8/1999 Chin
5,991,399 A 11/1999 Graunke et al.
5,991,749 A 11/1999 Morrill, Jr.
6,009,333 A * 12/1999 Chaco ................... H04M 3/436 340/8.1
6,016,476 A 1/2000 Maes et al.
6,018,739 A 1/2000 Mccoy et al.
6,025,780 A 2/2000 Bowers et al.
6,035,038 A 3/2000 Campinos et al.
6,035,329 A 3/2000 Mages et al.
6,038,334 A 3/2000 Hamid
6,038,549 A 3/2000 Davis et al.
6,038,666 A 3/2000 Hsu et al.
6,040,786 A 3/2000 Fujioka
6,041,410 A 3/2000 Hsu et al.
6,042,006 A 3/2000 Van Tilburg et al.
6,044,470 A * 3/2000 Kuriyama ............ G06Q 20/341 726/19
6,045,039 A 4/2000 Stinson et al.
6,052,468 A 4/2000 Hillhouse
6,055,314 A 4/2000 Spies et al.
6,068,184 A 5/2000 Barnett
6,069,647 A 5/2000 Sullivan et al.
6,070,796 A 6/2000 Sirbu
6,076,164 A 6/2000 Tanaka et al.
6,088,450 A 7/2000 Davis et al.
6,088,730 A 7/2000 Kato et al.
6,104,290 A 8/2000 Naguleswaran
6,104,334 A 8/2000 Allport
6,110,041 A 8/2000 Walker et al.
6,121,544 A 9/2000 Petsinger
6,134,283 A 10/2000 Sands et al.
6,137,480 A * 10/2000 Shintani .................. G06F 21/35 345/169
6,138,010 A 10/2000 Rabe et al.
6,148,142 A 11/2000 Anderson
6,148,210 A 11/2000 Elwin et al.
6,161,179 A 12/2000 Seidel
6,175,921 B1 1/2001 Rosen
6,177,887 B1 1/2001 Jerome
6,185,316 B1 2/2001 Buffam
6,189,105 B1 2/2001 Lopes
6,209,089 B1 3/2001 Selitrennikoff et al.
6,219,109 B1 4/2001 Raynesford et al.
6,219,439 B1 4/2001 Burger
6,219,553 B1 4/2001 Panasik
6,237,848 B1 5/2001 Everett
6,240,076 B1 5/2001 Kanerva et al.
6,247,130 B1 6/2001 Fritsch
6,249,869 B1 6/2001 Drupsteen et al.
6,250,557 B1 * 6/2001 Forslund .............. G06Q 20/229 235/375
6,256,737 B1 7/2001 Bianco et al.
6,266,415 B1 7/2001 Campinos et al.
6,270,011 B1 8/2001 Gottfried
6,279,111 B1 8/2001 Jensenworth et al.
6,279,146 B1 8/2001 Evans et al.
6,295,057 B1 9/2001 Rosin et al.
6,307,471 B1 10/2001 Xydis
6,317,755 B1 * 11/2001 Rakers .................. G07F 7/1008 705/52
6,325,285 B1 12/2001 Baratelli

(56) References Cited

U.S. PATENT DOCUMENTS 6,336,121 B1 1/2002 Lyson et al.
6,336,142 B1 1/2002 Kato et al.
6,343,280 B2 1/2002 Clark
6,345,347 B1 2/2002 Biran
6,363,485 B1 3/2002 Adams et al.
6,367,019 B1 4/2002 Ansell et al.
6,369,693 B1 4/2002 Gibson
6,370,376 B1 4/2002 Sheath
6,381,029 B1 4/2002 Tipirneni
6,381,747 B1 4/2002 Wonfor et al.
6,385,596 B1 5/2002 Wiser et al.
6,392,664 B1 5/2002 White et al.
6,397,387 B1 5/2002 Rosin et al.
6,401,059 B1 6/2002 Shen et al.
6,411,307 B1 6/2002 Rosin et al.
6,424,249 B1 7/2002 Houvener
6,424,715 B1 7/2002 Saito
6,425,084 B1 7/2002 Rallis et al.
6,434,403 B1 8/2002 Ausems et al.
6,434,535 B1 8/2002 Kupka et al.
6,446,004 B1 9/2002 Cao et al.
6,446,130 B1 9/2002 Grapes
6,456,958 B1 * 9/2002 Xydis ...................... G07C 9/28 702/158
6,463,534 B1 10/2002 Geiger et al.
6,480,101 B1 11/2002 Kelly et al.
6,480,188 B1 11/2002 Horsley
6,484,182 B1 11/2002 Dunphy et al.
6,484,260 B1 11/2002 Scott et al.
6,484,946 B2 11/2002 Matsumoto et al.
6,487,663 B1 11/2002 Jaisimha et al.
6,490,443 B1 12/2002 Freeny, Jr.
6,510,350 B1 1/2003 Steen et al.
6,522,253 B1 2/2003 Saltus
6,523,113 B1 2/2003 Wehrenberg
6,529,949 B1 3/2003 Getsin et al.
6,546,418 B2 4/2003 Schena et al.
6,550,011 B1 4/2003 Sims, III
6,563,465 B2 5/2003 Frecska
6,563,805 B1 5/2003 Ma et al.
6,564,380 B1 5/2003 Murphy
6,577,238 B1 6/2003 Whitesmith et al.
6,593,887 B2 7/2003 Luk et al.
6,597,680 B1 7/2003 Lindskog et al.
6,607,136 B1 8/2003 Atsmon et al.
6,621,528 B1 9/2003 Kessler et al.
6,624,752 B2 9/2003 Klitsgaard et al.
6,628,302 B2 9/2003 White et al.
6,632,992 B2 10/2003 Hasegawa
6,633,981 B1 10/2003 Davis
6,645,077 B2 11/2003 Rowe
6,647,417 B1 11/2003 Hunter et al.
6,657,538 B1 12/2003 Ritter
6,658,566 B1 12/2003 Hazard
6,667,684 B1 12/2003 Waggamon et al.
6,669,096 B1 12/2003 Saphar et al.
6,671,808 B1 12/2003 Abbott et al.
6,683,954 B1 1/2004 Searle
6,695,207 B1 * 2/2004 Norris, Jr. ............. G07F 7/1008 235/382
6,697,944 B1 2/2004 Jones et al.
6,709,333 B1 3/2004 Bradford et al.
6,711,464 B1 3/2004 Yap et al.
6,714,168 B2 3/2004 Berenbaum
6,715,246 B1 4/2004 Frecska et al.
6,728,397 B2 4/2004 McNeal
6,737,955 B2 5/2004 Ghabra et al.
6,738,772 B2 5/2004 Regelski et al.
6,758,394 B2 7/2004 Maskatiya et al.
6,771,969 B1 8/2004 Chinoy et al.
6,775,655 B1 8/2004 Peinado et al.
6,785,474 B2 8/2004 Hirt et al.
6,788,640 B2 9/2004 Celeste
6,788,924 B1 9/2004 Knutson et al.
6,795,425 B1 9/2004 Raith
6,804,825 B1 10/2004 White et al.
6,806,887 B2 10/2004 Chernock et al.
6,819,219 B1 11/2004 Bolle et al.
6,839,542 B2 1/2005 Sibecas et al.
6,839,772 B1 1/2005 Kowalski et al.
6,850,147 B2 2/2005 Prokoski et al.
6,853,988 B1 2/2005 Dickinson et al.
6,859,812 B1 2/2005 Poynor
6,861,980 B1 3/2005 Rowitch et al.
6,871,063 B1 3/2005 Schiffer
6,873,975 B1 3/2005 Hatakeyama et al.
6,879,567 B2 4/2005 Callaway et al.
6,879,966 B1 4/2005 Lapsley et al.
6,886,741 B1 5/2005 Salveson
6,889,067 B2 5/2005 Willey
6,891,822 B1 5/2005 Gubbi et al.
6,892,307 B1 5/2005 Wood et al.
6,930,643 B2 8/2005 Byrne et al.
6,934,855 B1 * 8/2005 Kipnis ............... G06Q 20/3672 235/382
6,947,003 B2 9/2005 Huor
6,950,941 B1 9/2005 Lee et al.
6,957,086 B2 10/2005 Bahl et al.
6,961,858 B2 11/2005 Fransdonk
6,963,270 B1 11/2005 Gallagher et al.
6,963,971 B1 11/2005 Bush et al.
6,973,576 B2 12/2005 Giobbi
6,975,202 B1 12/2005 Rodriguez et al.
6,980,087 B2 12/2005 Zukowski
6,983,882 B2 1/2006 Cassone
6,999,032 B2 2/2006 Pakray et al.
7,012,503 B2 3/2006 Nielsen
7,020,635 B2 3/2006 Hamilton et al.
7,020,785 B2 * 3/2006 Kim ........................ G06F 21/35 726/36
7,031,945 B1 4/2006 Donner
7,049,963 B2 5/2006 Waterhouse et al.
7,055,171 B1 5/2006 Martin et al.
7,058,806 B2 6/2006 Smeets et al.
7,061,380 B1 6/2006 Orlando et al.
7,068,623 B1 6/2006 Barany et al.
7,072,900 B2 7/2006 Sweitzer et al.
7,079,079 B2 7/2006 Jo et al.
7,080,049 B2 7/2006 Truitt et al.
7,082,415 B1 7/2006 Robinson et al.
7,090,126 B2 8/2006 Kelly et al.
7,090,128 B2 8/2006 Farley et al.
7,100,053 B1 8/2006 Brown et al.
7,107,455 B1 9/2006 Merkin
7,107,462 B2 9/2006 Fransdonk
7,111,789 B2 9/2006 Rajasekaran et al.
7,112,138 B2 9/2006 Hedrick et al.
7,119,659 B2 10/2006 Bonalle et al.
7,123,149 B2 10/2006 Nowak et al.
7,130,668 B2 10/2006 Chang et al.
7,131,139 B1 10/2006 Meier
7,137,008 B1 11/2006 Hamid et al.
7,137,012 B1 11/2006 Kamibayashi et al.
7,139,914 B2 11/2006 Arnouse
7,150,045 B2 12/2006 Koelle et al.
7,155,416 B2 12/2006 Shatford
7,159,114 B1 1/2007 Zajkowski et al.
7,159,765 B2 1/2007 Frerking
7,167,987 B2 1/2007 Angelo
7,168,089 B2 1/2007 Nguyen et al.
7,176,797 B2 2/2007 Zai et al.
7,185,363 B1 2/2007 Narin et al.
7,188,110 B1 3/2007 Ludtke et al.
7,191,466 B1 3/2007 Hamid et al.
7,194,438 B2 3/2007 Sovio et al.
7,209,955 B1 4/2007 Major et al.
7,218,944 B2 5/2007 Cromer et al.
7,225,161 B2 5/2007 Lam et al.
7,230,908 B2 6/2007 Vanderaar et al.
7,231,068 B2 6/2007 Tibor
7,231,451 B2 6/2007 Law et al.
7,239,226 B2 7/2007 Berardi et al.
7,239,241 B2 7/2007 Claudatos et al.
7,242,923 B2 7/2007 Perera et al.

(56) References Cited

U.S. PATENT DOCUMENTS 7,245,221 B2 7/2007 Claudatos et al.
7,249,177 B1 7/2007 Miller
7,272,723 B1 9/2007 Abbott et al.
7,277,737 B1 10/2007 Vollmer et al.
7,278,025 B2 10/2007 Saito et al.
7,283,650 B1 10/2007 Sharma et al.
7,295,106 B1 11/2007 Jackson et al.
7,295,119 B2 11/2007 Rappaport et al.
7,305,560 B2 12/2007 Giobbi
7,310,042 B2 12/2007 Seifert
7,314,164 B2 1/2008 Bonalle et al.
7,317,799 B2 1/2008 Hammersmith et al.
7,319,395 B2 1/2008 Puzio et al.
7,323,991 B1 1/2008 Eckert et al.
7,330,108 B2 2/2008 Thomas
7,333,002 B2 2/2008 Bixler et al.
7,333,615 B1 2/2008 Jarboe et al.
7,336,181 B2 2/2008 Nowak et al.
7,336,182 B1 2/2008 Baranowski et al.
7,337,326 B2 2/2008 Palmer et al.
7,341,181 B2 3/2008 Bonalle et al.
7,342,503 B1 3/2008 Light et al.
7,349,557 B2 3/2008 Tibor
7,356,393 B1 4/2008 Schlatre et al.
7,356,706 B2 4/2008 Scheurich
7,361,919 B2 4/2008 Setlak
7,363,494 B2 4/2008 Brainard et al.
7,370,366 B2 5/2008 Lacan et al.
7,378,939 B2 5/2008 Sengupta et al.
7,380,202 B1 5/2008 Lindhorst et al.
7,382,799 B1 6/2008 Young et al.
7,387,235 B2 6/2008 Gilbert et al.
7,401,731 B1 7/2008 Pletz et al.
7,404,088 B2 7/2008 Giobbi
7,408,799 B1 8/2008 Kang
7,424,134 B2 9/2008 Chou
7,437,330 B1 10/2008 Robinson et al.
7,443,297 B1 10/2008 Baranowski et al.
7,447,911 B2 11/2008 Chou et al.
7,448,087 B2 11/2008 Ohmori et al.
7,458,510 B1 12/2008 Zhou
7,460,836 B2 12/2008 Smith et al.
7,461,444 B2 12/2008 Deaett et al.
7,464,053 B1 12/2008 Pylant
7,464,059 B1 12/2008 Robinson et al.
7,466,232 B2 12/2008 Neuwirth
7,472,280 B2 12/2008 Giobbi
7,477,285 B1 1/2009 Johnson
7,512,806 B2 3/2009 Lemke
7,525,413 B2 4/2009 Jung et al.
7,529,944 B2 5/2009 Hamid
7,533,809 B1 5/2009 Robinson et al.
7,545,312 B2 6/2009 Kiang et al.
7,552,872 B2 * 6/2009 Tokita .................... H04B 10/40
235/440
7,565,329 B2 7/2009 Lapsley et al.
7,573,382 B2 8/2009 Choubey et al.
7,573,841 B2 8/2009 Lee et al.
7,574,734 B2 8/2009 Fedronic et al.
7,578,442 B2 8/2009 Knowles et al.
7,583,238 B2 9/2009 Cassen et al.
7,583,643 B2 9/2009 Smith et al.
7,587,502 B2 9/2009 Crawford et al.
7,587,611 B2 9/2009 Johnson et al.
7,594,611 B1 9/2009 Arrington, III
7,595,765 B1 9/2009 Hirsch et al.
7,603,564 B2 10/2009 Adachi
7,606,733 B2 10/2009 Shmueli et al.
7,617,523 B2 11/2009 Das et al.
7,620,184 B2 11/2009 Marque Pucheu
7,624,073 B1 11/2009 Robinson et al.
7,624,417 B2 11/2009 Dua
7,640,273 B2 12/2009 Wallmeier et al.
7,644,043 B2 1/2010 Minowa
7,644,443 B2 1/2010 Matsuyama et al.
7,646,307 B2 1/2010 Plocher et al.
7,652,892 B2 1/2010 Shiu et al.
7,653,883 B2 1/2010 Hotelling et al.
7,676,380 B2 3/2010 Graves et al.
7,681,050 B2 3/2010 Blom et al.
7,689,005 B2 3/2010 Wang et al.
7,701,858 B2 4/2010 Werb et al.
7,706,896 B2 4/2010 Music et al.
7,711,152 B1 5/2010 Davida et al.
7,711,586 B2 5/2010 Aggarwal et al.
7,715,593 B1 5/2010 Adams et al.
7,724,713 B2 5/2010 Del Prado Pavon et al.
7,724,717 B2 5/2010 Porras et al.
7,724,720 B2 5/2010 Korpela et al.
7,726,566 B2 6/2010 Brown et al.
7,734,476 B2 6/2010 Wildman et al.
7,764,236 B2 7/2010 Hill et al.
7,765,164 B1 7/2010 Robinson et al.
7,765,181 B2 7/2010 Thomas et al.
7,768,960 B1 8/2010 Barratt
7,773,754 B2 8/2010 Buer et al.
7,774,613 B2 8/2010 Lemke
7,780,082 B2 8/2010 Handa et al.
7,796,551 B1 9/2010 Machiraju et al.
7,813,822 B1 10/2010 Hoffberg
7,865,448 B2 1/2011 Pizarro
7,865,937 B1 1/2011 White et al.
7,883,003 B2 2/2011 Giobbi et al.
7,883,417 B2 2/2011 Bruzzese et al.
7,904,718 B2 3/2011 Giobbi et al.
7,943,868 B2 5/2011 Anders et al.
7,957,536 B2 6/2011 Nolte
7,961,078 B1 6/2011 Reynolds et al.
7,984,064 B2 7/2011 Fusari
7,996,514 B2 8/2011 Baumert et al.
8,011,588 B2 * 9/2011 Kon .................... G06Q 20/045
235/472.01
8,026,821 B2 9/2011 Reeder et al.
8,036,152 B2 10/2011 Brown et al.
8,041,582 B2 10/2011 Godschall et al.
8,049,594 B1 11/2011 Baranowski
8,077,041 B2 12/2011 Stern et al.
8,081,215 B2 12/2011 Kuo et al.
8,082,160 B2 12/2011 Collins et al.
8,089,354 B2 1/2012 Perkins
8,112,066 B2 2/2012 Ben Ayed
8,117,125 B1 2/2012 Kawan et al.
8,125,624 B2 2/2012 Jones et al.
8,135,624 B1 3/2012 Ramalingam et al.
8,171,528 B1 5/2012 Brown
8,193,923 B2 6/2012 Rork et al.
8,200,980 B1 6/2012 Robinson et al.
8,215,552 B1 7/2012 Rambadt
8,219,129 B2 7/2012 Brown et al.
8,248,263 B2 8/2012 Shervey et al.
8,258,942 B1 9/2012 Lanzone et al.
8,284,748 B2 10/2012 Borghei
8,294,554 B2 10/2012 Shoarinejad et al.
8,296,573 B2 10/2012 Bolle et al.
8,307,414 B2 11/2012 Zerfos et al.
8,325,011 B2 12/2012 Butler et al.
8,327,151 B2 12/2012 Awatsu et al.
8,333,317 B2 12/2012 Buer et al.
8,340,672 B2 12/2012 Brown et al.
8,352,730 B2 1/2013 Giobbi
8,373,562 B1 2/2013 Heinze et al.
8,387,124 B2 2/2013 Smetters et al.
8,390,456 B2 3/2013 Puleston et al.
8,395,484 B2 3/2013 Fullerton
8,410,906 B1 4/2013 Dacus et al.
8,412,949 B2 4/2013 Giobbi et al.
8,421,606 B2 4/2013 Collins et al.
8,424,079 B2 4/2013 Adams et al.
8,432,262 B2 4/2013 Talty et al.
8,433,919 B2 4/2013 Giobbi et al.
8,448,858 B1 5/2013 Kundu et al.
8,457,672 B2 6/2013 Brown et al.
8,467,969 B2 6/2013 Nielsen et al.
8,473,748 B2 6/2013 Sampas

(56) References Cited

U.S. PATENT DOCUMENTS 8,484,696 B2 7/2013 Gatto et al.
8,494,576 B1 7/2013 Bye et al.
8,508,336 B2 8/2013 Giobbi et al.
8,511,555 B2 8/2013 Babcock et al.
8,519,823 B2 8/2013 Rinkes
8,522,019 B2 8/2013 Michaelis
8,558,699 B2 10/2013 Butler et al.
8,572,391 B2 10/2013 Golan et al.
8,577,091 B2 11/2013 Ivanov et al.
8,600,674 B1 12/2013 Barbeau et al.
8,646,042 B1 2/2014 Brown
8,659,427 B2 2/2014 Brown et al.
8,678,273 B2 3/2014 Mcneal
8,717,346 B2 5/2014 Claessen
8,738,925 B1 5/2014 Park et al.
8,799,574 B2 8/2014 Corda
8,838,993 B2 9/2014 Giobbi et al.
8,856,539 B2 10/2014 Weiss
8,857,716 B1 10/2014 Giobbi et al.
8,886,954 B1 11/2014 Giobbi
8,907,861 B2 12/2014 Hirt
8,914,477 B2 12/2014 Gammon
8,918,854 B1 12/2014 Giobbi
8,931,698 B2 1/2015 Ishikawa et al.
8,977,860 B2 3/2015 Barrus et al.
8,979,646 B2 3/2015 Moser et al.
9,020,854 B2 4/2015 Giobbi
9,024,719 B1 5/2015 Saunders
9,037,140 B1 5/2015 Brown
9,042,819 B2 5/2015 Dua
9,049,188 B1 6/2015 Brown
9,098,954 B1 8/2015 Byrd
9,113,464 B2 8/2015 Brown et al.
9,165,233 B2 10/2015 Testanero
9,189,788 B1 11/2015 Robinson et al.
9,230,399 B2 1/2016 Yacenda
9,235,700 B1 1/2016 Brown
9,251,326 B2 2/2016 Giobbi et al.
9,251,332 B2 2/2016 Giobbi
9,265,043 B2 2/2016 Brown et al.
9,265,450 B1 2/2016 Giobbi
9,269,221 B2 2/2016 Brown et al.
9,276,914 B2 3/2016 Woodward et al.
9,298,905 B1 3/2016 Giobbi
9,305,312 B2 4/2016 Kountotsis et al.
9,322,974 B1 4/2016 Giobbi
9,405,898 B2 8/2016 Giobbi
9,418,205 B2 8/2016 Giobbi
9,430,624 B1 8/2016 Mortensen et al.
9,450,956 B1 9/2016 Giobbi
9,542,542 B2 1/2017 Giobbi et al.
9,613,483 B2 4/2017 Giobbi
9,679,289 B1 6/2017 Brown
9,728,080 B1 8/2017 Giobbi et al.
9,807,091 B2 10/2017 Giobbi
9,830,504 B2 11/2017 Masood et al.
9,892,250 B2 2/2018 Giobbi
9,898,662 B2 2/2018 Tsuda et al.
9,904,816 B1 2/2018 Giobbi et al.
9,990,628 B2 6/2018 Giobbi
10,026,253 B2 7/2018 Giobbi
10,073,960 B1 9/2018 Brown
10,110,385 B1 10/2018 Rush et al.
10,140,073 B2 11/2018 Chang et al.
10,171,460 B2 1/2019 Giobbi
10,217,339 B1 2/2019 Giobbi
10,229,294 B1 3/2019 Giobbi et al.
10,303,867 B2 5/2019 Snke
10,313,336 B2 6/2019 Giobbi
10,334,541 B1 6/2019 Brown
10,341,483 B2 7/2019 Dods et al.
10,362,483 B2 7/2019 Frusina
10,374,795 B1 8/2019 Giobbi et al.
10,383,112 B2 8/2019 Brown et al.
10,403,128 B2 9/2019 Giobbi et al.
10,405,181 B2 9/2019 Li et al.
10,437,976 B2 10/2019 Giobbi
10,455,533 B2 10/2019 Brown
10,469,456 B1 11/2019 Giobbi
10,567,965 B2 2/2020 Boettcher et al.
10,572,700 B2 2/2020 Sengstaken et al.
10,698,989 B2 * 6/2020 Giobbi .................. G07C 9/257
10,755,300 B2 8/2020 Goodhart et al.
10,764,044 B1 9/2020 Giobbi et al.
10,769,939 B2 9/2020 Brown et al.
10,817,964 B2 10/2020 Guillama et al.
10,856,148 B2 12/2020 Li et al.
10,902,723 B2 1/2021 Doyle, III
10,909,229 B2 2/2021 Giobbi
10,929,869 B2 2/2021 Rosenberg
10,943,471 B1 3/2021 Giobbi et al.
11,086,979 B1 8/2021 Giobbi
11,212,797 B2 12/2021 Brown et al.
11,219,022 B2 1/2022 Brown et al.
11,562,644 B2 1/2023 Brown et al.
11,914,695 B2 2/2024 Giobbi
2001/0000535 A1 4/2001 Lapsley et al.
2001/0011276 A1 8/2001 Durst et al.
2001/0014885 A1 * 8/2001 Yanagi ................ G06Q 20/341
705/65
2001/0018763 A1 * 8/2001 Ikeda ................... G07F 7/1008
717/122
2001/0021950 A1 9/2001 Hawley et al.
2001/0024428 A1 9/2001 Onouchi
2001/0026619 A1 10/2001 Howard et al.
2001/0027121 A1 10/2001 Boesen
2001/0027439 A1 10/2001 Holtzman et al.
2001/0034659 A1 10/2001 Kobayashi
2001/0036297 A1 11/2001 Ikegami et al.
2001/0044337 A1 11/2001 Rowe et al.
2002/0004783 A1 1/2002 Paltenghe et al.
2002/0007456 A1 1/2002 Peinado et al.
2002/0010679 A1 1/2002 Felsher
2002/0013772 A1 1/2002 Peinado
2002/0014954 A1 2/2002 Fitzgibbon et al.
2002/0015008 A1 2/2002 Kishida et al.
2002/0015494 A1 2/2002 Nagai et al.
2002/0019811 A1 2/2002 Lapsley et al.
2002/0022455 A1 2/2002 Salokannel et al.
2002/0023032 A1 2/2002 Pearson et al.
2002/0023217 A1 2/2002 Wheeler et al.
2002/0026424 A1 2/2002 Akashi
2002/0037732 A1 3/2002 Gous et al.
2002/0046336 A1 4/2002 Kon et al.
2002/0049806 A1 4/2002 Gatz et al.
2002/0052193 A1 5/2002 Chetty
2002/0055908 A1 5/2002 Di Giorgio et al.
2002/0056043 A1 5/2002 Glass
2002/0059114 A1 5/2002 Cockrill et al.
2002/0062249 A1 5/2002 Iannacci
2002/0064074 A1 * 5/2002 Kamise ................ G07F 7/0866
365/200
2002/0065778 A1 5/2002 Bouet et al.
2002/0068605 A1 6/2002 Stanley
2002/0069364 A1 6/2002 Dosch
2002/0071416 A1 6/2002 Carlson et al.
2002/0071559 A1 6/2002 Christensen et al.
2002/0073042 A1 6/2002 Maritzen et al.
2002/0073293 A1 * 6/2002 Mac.Smith ........ G06Q 20/3576
711/170
2002/0076051 A1 6/2002 Nii
2002/0078367 A1 6/2002 Lang et al.
2002/0080969 A1 6/2002 Giobbi
2002/0083178 A1 6/2002 Brothers
2002/0083318 A1 6/2002 Larose
2002/0086690 A1 7/2002 Takahashi et al.
2002/0089890 A1 7/2002 Fibranz et al.
2002/0091562 A1 7/2002 Siegel et al.
2002/0091646 A1 7/2002 Lake et al.
2002/0095586 A1 7/2002 Doyle et al.
2002/0095587 A1 7/2002 Doyle et al.
2002/0097876 A1 7/2002 Harrison
2002/0098888 A1 7/2002 Rowe et al.
2002/0100798 A1 8/2002 Farrugia et al.

(56) References Cited

U.S. PATENT DOCUMENTS

2002/0103027 A1 8/2002 Rowe et al.
2002/0103881 A1 8/2002 Granade et al.
2002/0104006 A1 8/2002 Boate et al.
2002/0104019 A1 8/2002 Chatani et al.
2002/0105918 A1 8/2002 Yamada et al.
2002/0108049 A1 8/2002 Xu et al.
2002/0109580 A1 8/2002 Shreve et al.
2002/0111919 A1 8/2002 Weller et al.
2002/0112183 A1 8/2002 Baird et al.
2002/0115444 A1 8/2002 Yu et al.
2002/0116615 A1 8/2002 Nguyen et al.
2002/0124251 A1 9/2002 Hunter et al.
2002/0128017 A1 9/2002 Kari
2002/0128057 A1 9/2002 Walker et al.
2002/0129262 A1 9/2002 Kutaragi et al.
2002/0138438 A1 9/2002 Bardwell
2002/0138445 A1 9/2002 Laage et al.
2002/0138767 A1 9/2002 Hamid et al.
2002/0138768 A1 9/2002 Murakami et al.
2002/0139848 A1 10/2002 Catan
2002/0140542 A1 10/2002 Prokoski et al.
2002/0141586 A1 10/2002 Margalit et al.
2002/0143623 A1 10/2002 Dayley
2002/0143634 A1 10/2002 Kumar et al.
2002/0143655 A1 10/2002 Elston et al.
2002/0144116 A1 10/2002 Giobbi
2002/0144117 A1 10/2002 Faigle
2002/0146347 A1 10/2002 McNeil
2002/0147653 A1 10/2002 Shmueli et al.
2002/0147658 A1 10/2002 Kwan
2002/0147912 A1 10/2002 Shmueli et al.
2002/0148892 A1 10/2002 Bardwell
2002/0150282 A1 10/2002 Kinsella
2002/0152391 A1 10/2002 Willins et al.
2002/0153996 A1 10/2002 Chan et al.
2002/0158121 A1 10/2002 Stanford-Clark
2002/0158750 A1 10/2002 Almalik
2002/0158765 A1 10/2002 Pape et al.
2002/0160820 A1 10/2002 Winkler
2002/0162009 A1 10/2002 Shmueli et al.
2002/0165803 A1* 11/2002 Iwase ................. G06Q 30/0207
705/14.1
2002/0174348 A1 11/2002 Ting
2002/0177460 A1 11/2002 Beasley et al.
2002/0178063 A1 11/2002 Gravelle et al.
2002/0184208 A1 12/2002 Kato
2002/0187746 A1 12/2002 Cheng et al.
2002/0191816 A1 12/2002 Maritzen et al.
2002/0196963 A1 12/2002 Bardwell
2002/0199120 A1 12/2002 Schmidt
2003/0001016 A1 1/2003 Fraier et al.
2003/0018522 A1 1/2003 Denimarck et al.
2003/0022701 A1 1/2003 Gupta
2003/0023882 A1 1/2003 Udom
2003/0024975 A1 2/2003 Rajasekharan
2003/0033203 A1* 2/2003 Inoue .................... G07F 7/1008
463/17
2003/0034877 A1 2/2003 Miller et al.
2003/0036416 A1 2/2003 Pattabiraman et al.
2003/0036425 A1 2/2003 Kaminkow et al.
2003/0044050 A1 3/2003 Clark et al.
2003/0046228 A1 3/2003 Berney
2003/0046237 A1 3/2003 Uberti
2003/0046552 A1 3/2003 Hamid
2003/0048174 A1 3/2003 Stevens et al.
2003/0051173 A1 3/2003 Krueger
2003/0054868 A1 3/2003 Paulsen et al.
2003/0054881 A1 3/2003 Hedrick et al.
2003/0055689 A1 3/2003 Block et al.
2003/0055792 A1 3/2003 Kinoshita et al.
2003/0061154 A1* 3/2003 Chacko ................... G07F 7/025
705/39
2003/0061172 A1 3/2003 Robinson
2003/0063619 A1 4/2003 Montano et al.
2003/0074575 A1 4/2003 Hoberock et al.
2003/0079133 A1 4/2003 Breiter et al.
2003/0087601 A1 5/2003 Agam et al.
2003/0088441 A1 5/2003 McNerney
2003/0105719 A1 6/2003 Berger et al.
2003/0109274 A1 6/2003 Budka et al.
2003/0115227 A1* 6/2003 Guthery ............. G06Q 20/3552
2003/0115351 A1 6/2003 Giobbi
2003/0115473 A1 6/2003 Sugimura et al.
2003/0115474 A1 6/2003 Khan et al.
2003/0117969 A1 6/2003 Koo et al.
2003/0117980 A1 6/2003 Kim et al.
2003/0120934 A1 6/2003 Ortiz
2003/0127511 A1 7/2003 Kelly et al.
2003/0128866 A1 7/2003 Mcneal
2003/0137404 A1 7/2003 Bonneau et al.
2003/0139190 A1 7/2003 Steelberg et al.
2003/0140221 A1 7/2003 Garnett
2003/0142041 A1 7/2003 Barlow et al.
2003/0146835 A1 8/2003 Carter
2003/0149744 A1 8/2003 Bierre et al.
2003/0152059 A1 8/2003 Odman
2003/0156742 A1 8/2003 Witt et al.
2003/0159040 A1 8/2003 Hashimoto et al.
2003/0163388 A1 8/2003 Beane
2003/0167207 A1 9/2003 Berardi et al.
2003/0169697 A1 9/2003 Suzuki et al.
2003/0172028 A1 9/2003 Abell et al.
2003/0172037 A1 9/2003 Jung et al.
2003/0174690 A1 9/2003 Benveniste
2003/0174839 A1 9/2003 Yamagata et al.
2003/0176218 A1 9/2003 Lemay et al.
2003/0177102 A1 9/2003 Robinson
2003/0186739 A1 10/2003 Paulsen et al.
2003/0187787 A1 10/2003 Freund
2003/0189092 A1* 10/2003 Takano ................ G06Q 20/341
235/380
2003/0195842 A1 10/2003 Reece
2003/0196084 A1 10/2003 Okereke et al.
2003/0199267 A1 10/2003 Iwasa et al.
2003/0200152 A1 10/2003 Divekar
2003/0204526 A1 10/2003 Salehi-Had
2003/0204721 A1 10/2003 Barrus et al.
2003/0213840 A1 11/2003 Livingston et al.
2003/0218533 A1 11/2003 Flick
2003/0223394 A1 12/2003 Parantainen et al.
2003/0225703 A1 12/2003 Angel
2003/0226031 A1 12/2003 Proudler et al.
2003/0227382 A1 12/2003 Breed
2003/0233458 A1 12/2003 Kwon et al.
2004/0002347 A1 1/2004 Hoctor et al.
2004/0015403 A1 1/2004 Moskowitz et al.
2004/0021552 A1 2/2004 Koo
2004/0022384 A1 2/2004 Flores et al.
2004/0025179 A1 2/2004 Russ et al.
2004/0029620 A1 2/2004 Karaoguz
2004/0029635 A1 2/2004 Giobbi
2004/0030764 A1 2/2004 Birk et al.
2004/0030894 A1 2/2004 Labrou et al.
2004/0035644 A1 2/2004 Ford et al.
2004/0039909 A1 2/2004 Cheng
2004/0043753 A1* 3/2004 Wake ...................... H04W 4/24
455/406
2004/0044627 A1 3/2004 Russell et al.
2004/0048570 A1 3/2004 Oba et al.
2004/0048609 A1 3/2004 Kosaka
2004/0049687 A1 3/2004 Orsini et al.
2004/0059682 A1 3/2004 Hasumi et al.
2004/0059912 A1 3/2004 Zizzi
2004/0064728 A1 4/2004 Scheurich
2004/0068656 A1 4/2004 Lu
2004/0073792 A1 4/2004 Noble et al.
2004/0077313 A1 4/2004 Oba et al.
2004/0081127 A1 4/2004 Gardner et al.
2004/0082385 A1 4/2004 Silva et al.
2004/0088558 A1 5/2004 Candelore
2004/0090345 A1 5/2004 Hitt
2004/0092231 A1* 5/2004 Ayatsuka ................ H04L 63/08
455/411
2004/0095911 A1 5/2004 Benveniste

(56) References Cited

U.S. PATENT DOCUMENTS

2004/0098597 A1 5/2004 Giobbi
2004/0103061 A1* 5/2004 Wood ...................... G07F 7/025 705/41
2004/0103062 A1* 5/2004 Wood ..................... G16H 10/65 705/41
2004/0103064 A1 5/2004 Howard et al.
2004/0107169 A1 6/2004 Lowe
2004/0114563 A1 6/2004 Shvodian
2004/0117644 A1 6/2004 Colvin
2004/0123106 A1 6/2004 D'Angelo et al.
2004/0123107 A1 6/2004 Miyazaki et al.
2004/0123127 A1 6/2004 Teicher et al.
2004/0124966 A1* 7/2004 Forrest .................... G07F 7/125 340/5.41
2004/0127277 A1 7/2004 Walker et al.
2004/0128162 A1 7/2004 Schlotterbeck et al.
2004/0128389 A1 7/2004 Kopchik
2004/0128500 A1 7/2004 Cihula et al.
2004/0128508 A1 7/2004 Wheeler et al.
2004/0128519 A1 7/2004 Klinger et al.
2004/0129787 A1 7/2004 Saito et al.
2004/0132432 A1 7/2004 Moores et al.
2004/0137912 A1 7/2004 Lin
2004/0153344 A1 8/2004 Bui et al.
2004/0153649 A1 8/2004 Rhoads et al.
2004/0158746 A1 8/2004 Hu et al.
2004/0166875 A1 8/2004 Jenkins et al.
2004/0167465 A1 8/2004 Mihai et al.
2004/0176032 A1 9/2004 Kotola et al.
2004/0181695 A1 9/2004 Walker
2004/0186768 A1 9/2004 Wakim et al.
2004/0193925 A1 9/2004 Safriel
2004/0194133 A1 9/2004 Ikeda et al.
2004/0201755 A1 10/2004 Norskog
2004/0203566 A1 10/2004 Leung
2004/0203885 A1 10/2004 Quaid
2004/0203923 A1 10/2004 Mullen
2004/0208139 A1 10/2004 Iwamura
2004/0209690 A1 10/2004 Bruzzese et al.
2004/0209692 A1 10/2004 Schober et al.
2004/0214582 A1 10/2004 Lan et al.
2004/0215615 A1 10/2004 Larsson et al.
2004/0217859 A1 11/2004 Pucci et al.
2004/0218581 A1 11/2004 Cattaneo
2004/0222877 A1 11/2004 Teramura et al.
2004/0230488 A1 11/2004 Beenau et al.
2004/0230809 A1 11/2004 Lowensohn et al.
2004/0234117 A1 11/2004 Tibor
2004/0238621 A1 12/2004 Beenau et al.
2004/0243519 A1 12/2004 Perttila et al.
2004/0246103 A1 12/2004 Zukowski
2004/0246934 A1 12/2004 Kim
2004/0246950 A1 12/2004 Parker et al.
2004/0250037 A1* 12/2004 Takemura ............ G07F 7/1083 711/164
2004/0250074 A1 12/2004 Kilian-Kehr
2004/0252012 A1 12/2004 Beenau et al.
2004/0252659 A1 12/2004 Yun et al.
2004/0253996 A1 12/2004 Chen et al.
2004/0254837 A1 12/2004 Roshkoff
2004/0255139 A1 12/2004 Giobbi
2004/0255145 A1 12/2004 Chow
2004/0262384 A1 12/2004 Nishida et al.
2005/0001028 A1 1/2005 Zuili
2005/0001720 A1 1/2005 Mason et al.
2005/0002028 A1 1/2005 Kasapi et al.
2005/0005136 A1 1/2005 Chen et al.
2005/0006452 A1 1/2005 Aupperle et al.
2005/0009517 A1 1/2005 Maes
2005/0020322 A1 1/2005 Ruuska et al.
2005/0021369 A1 1/2005 Cohen et al.
2005/0021561 A1 1/2005 Noonan
2005/0023345 A1* 2/2005 Furuyama ............. G06Q 20/18 235/382
2005/0025093 A1 2/2005 Yun et al.
2005/0028168 A1 2/2005 Marcjan
2005/0033689 A1 2/2005 Bonalle et al.
2005/0033703 A1 2/2005 Holdsworth
2005/0035897 A1 2/2005 Perl et al.
2005/0039027 A1 2/2005 Shapiro
2005/0040961 A1 2/2005 Tuttle
2005/0040968 A1 2/2005 Damarla et al.
2005/0044372 A1 2/2005 Aull et al.
2005/0044387 A1 2/2005 Ozolins
2005/0047386 A1 3/2005 Yi
2005/0049013 A1 3/2005 Chang et al.
2005/0050208 A1 3/2005 Chatani
2005/0050324 A1 3/2005 Corbett et al.
2005/0050367 A1 3/2005 Burger et al.
2005/0054431 A1 3/2005 Walker et al.
2005/0055242 A1 3/2005 Bello et al.
2005/0055244 A1 3/2005 Mullan et al.
2005/0058292 A1 3/2005 Diorio et al.
2005/0074126 A1 4/2005 Stanko
2005/0076242 A1 4/2005 Breuer
2005/0080973 A1 4/2005 Lee
2005/0081040 A1 4/2005 Johnson et al.
2005/0084137 A1 4/2005 Kim et al.
2005/0085259 A1 4/2005 Conner et al.
2005/0086115 A1 4/2005 Pearson
2005/0086497 A1 4/2005 Nakayama
2005/0086501 A1 4/2005 Woo et al.
2005/0086515 A1 4/2005 Paris
2005/0089000 A1 4/2005 Bae et al.
2005/0090200 A1 4/2005 Karaoguz et al.
2005/0091338 A1 4/2005 De La Huerga
2005/0091553 A1 4/2005 Chien et al.
2005/0094657 A1 5/2005 Sung et al.
2005/0096053 A1 5/2005 Liu et al.
2005/0097037 A1 5/2005 Tibor
2005/0099824 A1 5/2005 Dowling et al.
2005/0105600 A1 5/2005 Culum et al.
2005/0105734 A1 5/2005 Buer et al.
2005/0107965 A1* 5/2005 Kerr ......................... G07C 9/22 702/57
2005/0108164 A1 5/2005 Salafia et al.
2005/0109836 A1 5/2005 Ben-Aissa
2005/0109841 A1 5/2005 Ryan et al.
2005/0113070 A1 5/2005 Okabe
2005/0113102 A1 5/2005 Kwon et al.
2005/0114149 A1 5/2005 Rodriguez et al.
2005/0114150 A1 5/2005 Franklin
2005/0114654 A1 5/2005 Brackett et al.
2005/0116020 A1 6/2005 Smolucha et al.
2005/0116050 A1 6/2005 Jei et al.
2005/0117530 A1 6/2005 Abraham et al.
2005/0119979 A1 6/2005 Murashita et al.
2005/0124294 A1 6/2005 Wentink
2005/0125258 A1 6/2005 Yellin et al.
2005/0128083 A1 6/2005 Puzio et al.
2005/0136947 A1 6/2005 Llombart-Juan et al.
2005/0137827 A1 6/2005 Takamiya
2005/0137977 A1 6/2005 Wankmueller
2005/0138390 A1 6/2005 Adams et al.
2005/0138576 A1 6/2005 Baumert et al.
2005/0139656 A1 6/2005 Arnouse
2005/0141451 A1 6/2005 Yoon et al.
2005/0149358 A1 7/2005 Sacco et al.
2005/0151623 A1 7/2005 von Hoffmann
2005/0152394 A1 7/2005 Cho
2005/0154897 A1 7/2005 Holloway et al.
2005/0161503 A1 7/2005 Remery et al.
2005/0165684 A1 7/2005 Jensen et al.
2005/0166063 A1 7/2005 Huang
2005/0167482 A1 8/2005 Ramachandran et al.
2005/0169292 A1 8/2005 Young
2005/0177716 A1 8/2005 Ginter et al.
2005/0180385 A1 8/2005 Jeong et al.
2005/0181875 A1* 8/2005 Hoehne ................. G07F 17/323 463/41
2005/0182661 A1 8/2005 Allard et al.
2005/0182975 A1 8/2005 Guo et al.
2005/0187368 A1 8/2005 Ebling et al.

(56) References Cited

U.S. PATENT DOCUMENTS

2005/0187792 A1 8/2005 Harper
2005/0192748 A1 9/2005 Andric et al.
2005/0195975 A1 9/2005 Kawakita
2005/0198208 A1 9/2005 Nystrom
2005/0200453 A1 9/2005 Turner et al.
2005/0201345 A1 9/2005 Williamson
2005/0201389 A1 9/2005 Shimanuki et al.
2005/0203682 A1 9/2005 Omino et al.
2005/0203844 A1 9/2005 Ferguson et al.
2005/0210270 A1 9/2005 Rohatgi et al.
2005/0212657 A1 9/2005 Simon
2005/0215233 A1 9/2005 Perera et al.
2005/0216313 A1 9/2005 Claud et al.
2005/0216639 A1 9/2005 Sparer et al.
2005/0218215 A1 10/2005 Lauden
2005/0220046 A1 10/2005 Falck et al.
2005/0221869 A1 10/2005 Liu et al.
2005/0224573 A1 10/2005 Yoshizane et al.
2005/0229007 A1 10/2005 Bolle et al.
2005/0229240 A1 10/2005 Nanba
2005/0231328 A1 10/2005 Castle et al.
2005/0235364 A1 10/2005 Wilson
2005/0242921 A1* 11/2005 Zimmerman ............ G07C 9/22 340/5.2
2005/0243787 A1 11/2005 Hong et al.
2005/0246416 A1 11/2005 Blomquist
2005/0249385 A1 11/2005 Kondo et al.
2005/0251688 A1 11/2005 Nanavati et al.
2005/0253683 A1 11/2005 Lowe
2005/0256878 A1* 11/2005 Brown ................ G06F 12/1458
2005/0257072 A1 11/2005 Cross et al.
2005/0257102 A1 11/2005 Moyer et al.
2005/0258229 A1* 11/2005 Minemura ......... G06K 19/0719 345/169
2005/0264416 A1 12/2005 Maurer
2005/0265371 A1 12/2005 Sharma et al.
2005/0268111 A1 12/2005 Markham
2005/0269401 A1 12/2005 Spitzer et al.
2005/0272403 A1 12/2005 Ryu et al.
2005/0277385 A1 12/2005 Daum
2005/0278547 A1 12/2005 Hyndman et al.
2005/0281215 A1 12/2005 Budampati et al.
2005/0281320 A1 12/2005 Neugebauer
2005/0282558 A1 12/2005 Choi et al.
2005/0284932 A1 12/2005 Sukeda et al.
2005/0287985 A1 12/2005 Balfanz et al.
2005/0288015 A1 12/2005 Azizi et al.
2005/0288069 A1 12/2005 Arunan et al.
2005/0289473 A1 12/2005 Gustafson et al.
2006/0001525 A1 1/2006 Nitzan et al.
2006/0002349 A1 1/2006 Demirhan
2006/0005035 A1 1/2006 Coughlin
2006/0009216 A1 1/2006 Welnick et al.
2006/0014430 A1 1/2006 Liang et al.
2006/0022042 A1 2/2006 Smets et al.
2006/0022046 A1 2/2006 Iwamura
2006/0022800 A1 2/2006 Krishna et al.
2006/0025180 A1 2/2006 Rajkotia et al.
2006/0026338 A1* 2/2006 Ebara .................... G07F 7/1008 711/115
2006/0026673 A1 2/2006 Tsuchida
2006/0030279 A1 2/2006 Leabman
2006/0030353 A1 2/2006 Jun
2006/0034250 A1 2/2006 Kim et al.
2006/0034492 A1 2/2006 Siegel et al.
2006/0041746 A1 2/2006 Kirkup et al.
2006/0046664 A1 3/2006 Paradiso et al.
2006/0050742 A1 3/2006 Grandhi et al.
2006/0053234 A1 3/2006 Kumar et al.
2006/0058102 A1 3/2006 Nguyen et al.
2006/0063575 A1 3/2006 Gatto et al.
2006/0064320 A1 3/2006 Postrel
2006/0064605 A1 3/2006 Giobbi
2006/0065730 A1* 3/2006 Quan ........................ G06F 8/65 235/451
2006/0066441 A1 3/2006 Knadle et al.
2006/0069814 A1 3/2006 Abraham et al.
2006/0072586 A1 4/2006 Callaway et al.
2006/0074713 A1 4/2006 Conry et al.
2006/0075230 A1 4/2006 Baird et al.
2006/0075255 A1 4/2006 Duffy et al.
2006/0076401 A1 4/2006 Frerking
2006/0078176 A1 4/2006 Abiko et al.
2006/0080549 A1 4/2006 Okamura et al.
2006/0087407 A1 4/2006 Stewart et al.
2006/0089138 A1 4/2006 Smith et al.
2006/0095369 A1 5/2006 Hofi
2006/0095792 A1 5/2006 Hurtado et al.
2006/0097882 A1 5/2006 Brinkerhoff et al.
2006/0097949 A1 5/2006 Luebke et al.
2006/0101506 A1* 5/2006 Gallo ................. H04L 41/0803 726/3
2006/0106645 A1 5/2006 Bergelson et al.
2006/0110012 A1 5/2006 Ritter
2006/0111941 A1 5/2006 Blom
2006/0111955 A1 5/2006 Winter et al.
2006/0112423 A1 5/2006 Mlladiego et al.
2006/0113381 A1 6/2006 Hochstein et al.
2006/0116935 A1 6/2006 Evans
2006/0117013 A1 6/2006 Wada
2006/0120287 A1 6/2006 Foti et al.
2006/0129838 A1 6/2006 Chen et al.
2006/0136728 A1 6/2006 Gentry et al.
2006/0136742 A1 6/2006 Giobbi
2006/0136997 A1* 6/2006 Telek ...................... G01S 11/06 726/5
2006/0143441 A1 6/2006 Giobbi
2006/0144943 A1 7/2006 Kim
2006/0156027 A1 7/2006 Blake
2006/0158308 A1 7/2006 Mcmullen et al.
2006/0163349 A1 7/2006 Neugebauer
2006/0163350 A1 7/2006 Melton et al.
2006/0165060 A1 7/2006 Dua
2006/0169771 A1 8/2006 Brookner
2006/0170530 A1 8/2006 Nwosu et al.
2006/0170565 A1 8/2006 Husak et al.
2006/0172700 A1 8/2006 Wu
2006/0173846 A1 8/2006 Omae et al.
2006/0173991 A1* 8/2006 Piikivi .................. H04L 63/083 709/224
2006/0174349 A1 8/2006 Cronce et al.
2006/0183426 A1 8/2006 Graves et al.
2006/0183462 A1 8/2006 Kolehmainen
2006/0184531 A1 8/2006 Russlies
2006/0184795 A1 8/2006 Doradla et al.
2006/0185005 A1* 8/2006 Graves .................... G16Z 99/00 707/E17.001
2006/0187029 A1 8/2006 Thomas
2006/0190348 A1 8/2006 Ofer et al.
2006/0190413 A1 8/2006 Harper
2006/0194598 A1 8/2006 Kim et al.
2006/0195576 A1 8/2006 Rinne et al.
2006/0198337 A1 9/2006 Hoang et al.
2006/0200467 A1 9/2006 Ohmori et al.
2006/0205408 A1 9/2006 Nakagawa et al.
2006/0208066 A1 9/2006 Finn et al.
2006/0208853 A1 9/2006 Kung et al.
2006/0218196 A1* 9/2006 Kurita ................ G06Q 20/3576
2006/0222042 A1 10/2006 Teramura et al.
2006/0226950 A1 10/2006 Kanou et al.
2006/0229909 A1 10/2006 Kaila et al.
2006/0236373 A1 10/2006 Graves et al.
2006/0237528 A1 10/2006 Bishop et al.
2006/0238305 A1 10/2006 Loving et al.
2006/0245620 A1 11/2006 Roques et al.
2006/0255935 A1 11/2006 Scalisi et al.
2006/0258289 A1 11/2006 Dua
2006/0268891 A1 11/2006 Heidari-Bateni et al.
2006/0273176 A1 12/2006 Audebert et al.
2006/0274711 A1 12/2006 Nelson et al.
2006/0279412 A1 12/2006 Holland et al.
2006/0286969 A1 12/2006 Talmor et al.
2006/0287763 A1 12/2006 Ochi et al.
2006/0288095 A1 12/2006 Torok et al.

(56) References Cited

U.S. PATENT DOCUMENTS

2006/0288233 A1 12/2006 Kozlay
2006/0290473 A1 12/2006 Mahasenan et al.
2006/0290519 A1 12/2006 Boate et al.
2006/0290580 A1 12/2006 Noro et al.
2006/0292986 A1 12/2006 Bitran et al.
2006/0293925 A1 12/2006 Flom
2006/0294388 A1 12/2006 Abraham et al.
2007/0003111 A1 1/2007 Awatsu et al.
2007/0005403 A1 1/2007 Kennedy et al.
2007/0006298 A1 1/2007 Malone et al.
2007/0007331 A1 1/2007 Jasper et al.
2007/0008070 A1 1/2007 Friedrich
2007/0008916 A1 1/2007 Haugli et al.
2007/0011724 A1 1/2007 Gonzalez et al.
2007/0016637 A1 1/2007 Brawn et al.
2007/0016800 A1 1/2007 Spottswood et al.
2007/0019845 A1 1/2007 Kato
2007/0029381 A1 2/2007 Braiman
2007/0032225 A1 2/2007 Konicek et al.
2007/0032288 A1 2/2007 Nelson et al.
2007/0033072 A1 2/2007 Bildirici
2007/0033150 A1 2/2007 Nwosu
2007/0035381 A1* 2/2007 Davis ................. G06K 19/0723 340/5.74
2007/0035397 A1 2/2007 Patenaude et al.
2007/0036396 A1 2/2007 Sugita et al.
2007/0038751 A1 2/2007 Jorgensen
2007/0039041 A1* 2/2007 Davis .................. G06Q 20/341 726/5
2007/0043594 A1 2/2007 Lavergne
2007/0050259 A1 3/2007 Wesley
2007/0050398 A1 3/2007 Mochizuki
2007/0050845 A1 3/2007 Das et al.
2007/0051794 A1 3/2007 Glanz et al.
2007/0051798 A1 3/2007 Kawai et al.
2007/0055630 A1 3/2007 Gauthier et al.
2007/0060095 A1 3/2007 Subrahmanya et al.
2007/0060319 A1 3/2007 Block et al.
2007/0061041 A1 3/2007 Zweig
2007/0064742 A1 3/2007 Shvodian
2007/0069852 A1 3/2007 Mo et al.
2007/0070040 A1 3/2007 Chen et al.
2007/0072636 A1 3/2007 Worfolk et al.
2007/0073553 A1 3/2007 Flinn et al.
2007/0075135 A1 4/2007 Dettinger et al.
2007/0078761 A1 4/2007 Kagan et al.
2007/0084523 A1 4/2007 Mclean et al.
2007/0084913 A1 4/2007 Weston
2007/0087682 A1 4/2007 DaCosta
2007/0087834 A1 4/2007 Moser et al.
2007/0090195 A1* 4/2007 Kawamura ........... G06F 9/5016 235/492
2007/0094088 A1 4/2007 Mastie et al.
2007/0100507 A1 5/2007 Simon
2007/0100939 A1 5/2007 Bagley et al.
2007/0109117 A1 5/2007 Heitzmann et al.
2007/0112676 A1 5/2007 Kontio et al.
2007/0118891 A1 5/2007 Buer
2007/0119923 A1 5/2007 Garrison et al.
2007/0120643 A1 5/2007 Lee
2007/0120651 A1 5/2007 Kobayashi et al.
2007/0120698 A1 5/2007 Turk et al.
2007/0130025 A1 6/2007 Nakajima
2007/0132586 A1 6/2007 Plocher et al.
2007/0133478 A1 6/2007 Armbruster et al.
2007/0136103 A1 6/2007 Kim et al.
2007/0136407 A1 6/2007 Rudelic
2007/0142032 A1 6/2007 Balsillie
2007/0143626 A1 6/2007 Okuda
2007/0147332 A1 6/2007 Lappetelainen et al.
2007/0152826 A1 7/2007 August et al.
2007/0156850 A1 7/2007 Corrion
2007/0157249 A1 7/2007 Cordray et al.
2007/0158411 A1 7/2007 Krieg, Jr.
2007/0159301 A1 7/2007 Hirt et al.
2007/0159994 A1 7/2007 Brown et al.
2007/0164847 A1 7/2007 Crawford et al.
2007/0169121 A1 7/2007 Hunt et al.
2007/0174809 A1 7/2007 Brown et al.
2007/0174868 A1 7/2007 Hitaka
2007/0176756 A1 8/2007 Friedrich
2007/0176778 A1 8/2007 Ando et al.
2007/0180047 A1 8/2007 Dong et al.
2007/0180207 A1 8/2007 Garfinkle
2007/0187266 A1 8/2007 Porter et al.
2007/0192601 A1 8/2007 Spain et al.
2007/0194882 A1 8/2007 Yokota et al.
2007/0197261 A1 8/2007 Humbel
2007/0198436 A1 8/2007 Weiss
2007/0198848 A1 8/2007 Bjorn
2007/0204078 A1 8/2007 Boccon-Gibod et al.
2007/0205860 A1 9/2007 Jones et al.
2007/0205861 A1 9/2007 Nair et al.
2007/0207750 A1 9/2007 Brown et al.
2007/0213048 A1 9/2007 Trauberg
2007/0213090 A1 9/2007 Holmberg
2007/0214492 A1 9/2007 Gopi et al.
2007/0218921 A1 9/2007 Lee et al.
2007/0219926 A1 9/2007 Korn
2007/0220272 A1 9/2007 Campisi et al.
2007/0223403 A1 9/2007 Furuskar et al.
2007/0229260 A1 10/2007 Braun et al.
2007/0229268 A1 10/2007 Swan et al.
2007/0236332 A1 10/2007 Quan et al.
2007/0245157 A1 10/2007 Giobbi et al.
2007/0245158 A1 10/2007 Giobbi et al.
2007/0247366 A1 10/2007 Smith et al.
2007/0250718 A1 10/2007 Lee et al.
2007/0250920 A1 10/2007 Lindsay
2007/0258626 A1 11/2007 Reiner
2007/0260883 A1 11/2007 Giobbi et al.
2007/0260888 A1 11/2007 Giobbi et al.
2007/0262134 A1 11/2007 Humphrey et al.
2007/0266257 A1 11/2007 Camaisa et al.
2007/0268130 A1 11/2007 Yee et al.
2007/0268862 A1 11/2007 Singh et al.
2007/0271194 A1 11/2007 Walker et al.
2007/0271433 A1* 11/2007 Takemura ............ G06Q 20/341 711/164
2007/0273517 A1 11/2007 Govind
2007/0277044 A1 11/2007 Graf et al.
2007/0279190 A1* 12/2007 Lugt ....................... G06F 21/34 726/20
2007/0280509 A1 12/2007 Owen et al.
2007/0285212 A1 12/2007 Rotzoll
2007/0285238 A1 12/2007 Batra
2007/0287386 A1 12/2007 Agrawal et al.
2007/0288263 A1 12/2007 Rodgers
2007/0288752 A1 12/2007 Chan
2007/0293155 A1 12/2007 Liao et al.
2007/0294755 A1 12/2007 Dadhia et al.
2007/0296544 A1 12/2007 Beenau et al.
2007/0299782 A1 12/2007 Beenau et al.
2007/0300052 A1 12/2007 Jevans
2008/0001724 A1* 1/2008 Soleimani ............. H04L 63/083 340/5.74
2008/0001783 A1 1/2008 Cargonja et al.
2008/0005432 A1 1/2008 Kagawa
2008/0008359 A1 1/2008 Beenau et al.
2008/0011842 A1 1/2008 Curry et al.
2008/0012685 A1 1/2008 Friedrich et al.
2008/0012767 A1 1/2008 Caliri et al.
2008/0016004 A1* 1/2008 Kurasaki .............. G06Q 20/341 705/67
2008/0019578 A1 1/2008 Saito et al.
2008/0028227 A1 1/2008 Sakurai
2008/0028453 A1 1/2008 Nguyen et al.
2008/0040609 A1 2/2008 Giobbi
2008/0046366 A1 2/2008 Bemmel et al.
2008/0046715 A1 2/2008 Balazs et al.
2008/0049700 A1 2/2008 Shah et al.
2008/0056544 A1 3/2008 Aikawa et al.
2008/0061941 A1 3/2008 Fischer et al.
2008/0065181 A1 3/2008 Stevenson

(56) References Cited

U.S. PATENT DOCUMENTS

2008/0071577 A1 3/2008 Highley
2008/0072063 A1 3/2008 Takahashi et al.
2008/0077359 A1 3/2008 Ito
2008/0080022 A1 4/2008 Gogulapati
2008/0088475 A1 4/2008 Martin
2008/0090548 A1 4/2008 Ramalingam
2008/0094228 A1 4/2008 Welch et al.
2008/0095359 A1 4/2008 Schreyer et al.
2008/0107089 A1 5/2008 Larsson et al.
2008/0109895 A1 5/2008 Janevski
2008/0111752 A1 5/2008 Lindackers et al.
2008/0114694 A1 5/2008 Hamdane et al.
2008/0125965 A1 5/2008 Carani et al.
2008/0127176 A1 5/2008 Lee et al.
2008/0127225 A1 5/2008 Mullis, et al.
2008/0129450 A1 6/2008 Riegebauer
2008/0129463 A1 6/2008 Tuttle
2008/0141361 A1 6/2008 Balfanz
2008/0142588 A1 6/2008 Blum
2008/0148351 A1 6/2008 Bhatia et al.
2008/0149705 A1 6/2008 Giobbi et al.
2008/0150678 A1 6/2008 Giobbi et al.
2008/0154727 A1 6/2008 Carlson
2008/0156866 A1 7/2008 McNeal
2008/0159599 A1 7/2008 Kajihara et al.
2008/0164997 A1 7/2008 Aritsuka et al.
2008/0169909 A1* 7/2008 Park ........................ G06F 21/77 340/10.4
2008/0176713 A1 7/2008 Olivera et al.
2008/0180213 A1 7/2008 Flax
2008/0186166 A1 8/2008 Zhou et al.
2008/0188308 A1 8/2008 Shepherd et al.
2008/0195735 A1 8/2008 Hodges et al.
2008/0195863 A1 8/2008 Kennedy
2008/0201733 A1 8/2008 Ertugrul et al.
2008/0201768 A1 8/2008 Koo et al.
2008/0203107 A1 8/2008 Conley et al.
2008/0208016 A1 8/2008 Hughes et al.
2008/0209571 A1 8/2008 Bhaskar et al.
2008/0211627 A1 9/2008 Shinzaki
2008/0214300 A1* 9/2008 Williams ............ H04L 63/0428 463/29
2008/0218416 A1 9/2008 Handy et al.
2008/0222701 A1 9/2008 Saaranen et al.
2008/0223918 A1 9/2008 Williams et al.
2008/0228524 A1 9/2008 Brown
2008/0235144 A1 9/2008 Phillips
2008/0238625 A1 10/2008 Rofougaran et al.
2008/0246613 A1 10/2008 Linstrom et al.
2008/0250388 A1 10/2008 Meyer et al.
2008/0251579 A1 10/2008 Larsen
2008/0252419 A1 10/2008 Batchelor et al.
2008/0278325 A1 11/2008 Zimman et al.
2008/0278327 A1 11/2008 Nierenberg et al.
2008/0284597 A1 11/2008 Shah
2008/0289018 A1* 11/2008 Kawaguchi ......... H04L 63/0853 717/174
2008/0289030 A1 11/2008 Poplett
2008/0289032 A1 11/2008 Aoki et al.
2008/0303637 A1 12/2008 Gelbman et al.
2008/0303638 A1 12/2008 Nguyen et al.
2008/0306759 A1 12/2008 Ilkin et al.
2008/0313728 A1 12/2008 Pandrangi et al.
2008/0314971 A1 12/2008 Faith et al.
2008/0316002 A1 12/2008 Brunet et al.
2008/0316045 A1 12/2008 Sriharto et al.
2009/0002134 A1* 1/2009 McAllister ....... G06K 19/07749 340/10.51
2009/0006846 A1 1/2009 Rosenblatt
2009/0013191 A1 1/2009 Popowski
2009/0016573 A1 1/2009 Mcafee et al.
2009/0024584 A1 1/2009 Dharap et al.
2009/0033464 A1* 2/2009 Friedrich ................ G06F 21/35 340/10.1
2009/0033485 A1 2/2009 Naeve et al.
2009/0036164 A1 2/2009 Rowley
2009/0037326 A1* 2/2009 Chitti ..................... G06Q 20/10 715/812
2009/0040041 A1 2/2009 Janetis et al.
2009/0041309 A1 2/2009 Kim et al.
2009/0043253 A1 2/2009 Podaima
2009/0045916 A1 2/2009 Nitzan et al.
2009/0050686 A1* 2/2009 Kon ..................... G06Q 20/363 235/375
2009/0050688 A1* 2/2009 Kon ...................... G07F 7/0866 235/375
2009/0052389 A1 2/2009 Qin et al.
2009/0070146 A1 3/2009 Haider et al.
2009/0070219 A1 3/2009 D'Angelo et al.
2009/0075592 A1* 3/2009 Nystrom ................. H04L 67/34 455/41.1
2009/0076849 A1 3/2009 Diller
2009/0081996 A1 3/2009 Duggal et al.
2009/0085724 A1 4/2009 Naressi et al.
2009/0085748 A1 4/2009 Barnes et al.
2009/0094681 A1 4/2009 Sadler et al.
2009/0096580 A1 4/2009 Paananen
2009/0115609 A1 5/2009 Weaver
2009/0121890 A1 5/2009 Brown et al.
2009/0125401 A1 5/2009 Beenau et al.
2009/0138953 A1* 5/2009 Lyon ........................ G07C 9/22 726/9
2009/0140045 A1 6/2009 Evans
2009/0150762 A1 6/2009 Febonio et al.
2009/0157512 A1 6/2009 King
2009/0160646 A1 6/2009 Mackenzie et al.
2009/0165123 A1 6/2009 Giobbi
2009/0176566 A1 7/2009 Kelly
2009/0177495 A1 7/2009 Abousy et al.
2009/0182582 A1 7/2009 Hammon
2009/0195461 A1 8/2009 Hirt
2009/0199206 A1 8/2009 Finkenzeller et al.
2009/0200378 A1 8/2009 Doherty et al.
2009/0206992 A1 8/2009 Giobbi et al.
2009/0221301 A1 9/2009 Riley et al.
2009/0222908 A1 9/2009 Warren
2009/0232362 A1 9/2009 Otsubo et al.
2009/0237245 A1 9/2009 Brinton et al.
2009/0237253 A1 9/2009 Neuwirth
2009/0239667 A1 9/2009 Rowe et al.
2009/0253516 A1 10/2009 Hartmann et al.
2009/0254448 A1 10/2009 Giobbi
2009/0254971 A1 10/2009 Herz et al.
2009/0264712 A1 10/2009 Baldus et al.
2009/0307764 A1 12/2009 Isobe et al.
2009/0310514 A1 12/2009 Jeon et al.
2009/0313689 A1 12/2009 Nystroem et al.
2009/0319788 A1 12/2009 Zick et al.
2009/0320118 A1* 12/2009 Muller .................... G06F 21/34 726/9
2009/0322510 A1 12/2009 Berger et al.
2009/0322566 A1 12/2009 Shirakawa
2009/0327102 A1 12/2009 Maniar et al.
2009/0328182 A1 12/2009 Malakapalli et al.
2010/0005526 A1 1/2010 Tsuji et al.
2010/0007498 A1 1/2010 Jackson
2010/0008545 A1 1/2010 Ueki et al.
2010/0022239 A1 1/2010 Anzai
2010/0022308 A1 1/2010 Hartmann et al.
2010/0023074 A1 1/2010 Powers et al.
2010/0037255 A1 2/2010 Sheehan et al.
2010/0039280 A1 2/2010 Holm et al.
2010/0062743 A1 3/2010 Jonsson
2010/0077214 A1 3/2010 Jogand-Coulomb et al.
2010/0088116 A1 4/2010 Eisenberg et al.
2010/0091987 A1 4/2010 Takahashi et al.
2010/0117794 A1 5/2010 Adams et al.
2010/0127067 A1 5/2010 Eisenberg et al.
2010/0134257 A1 6/2010 Puleston et al.
2010/0169442 A1 7/2010 Liu et al.
2010/0169964 A1 7/2010 Liu et al.
2010/0172567 A1 7/2010 Prokoski
2010/0174911 A1 7/2010 Isshiki

(56) References Cited

U.S. PATENT DOCUMENTS

2010/0188226 A1 7/2010 Seder et al.
2010/0214100 A1 8/2010 Page
2010/0277283 A1 11/2010 Burkart et al.
2010/0277286 A1 11/2010 Burkart et al.
2010/0289644 A1 11/2010 Slavin et al.
2010/0291896 A1 11/2010 Corda
2010/0305843 A1 12/2010 Yan et al.
2010/0328033 A1 12/2010 Kamei
2010/0330958 A1* 12/2010 Corda .................... H04L 63/10 455/410
2011/0034160 A1* 2/2011 Corda ................ G06Q 20/3552 455/418
2011/0053605 A1 3/2011 Carpio et al.
2011/0072034 A1 3/2011 Sly et al.
2011/0072132 A1 3/2011 Shafer et al.
2011/0080264 A1 4/2011 Clare et al.
2011/0082735 A1 4/2011 Kannan et al.
2011/0085287 A1 4/2011 Ebrom et al.
2011/0091136 A1 4/2011 Danch et al.
2011/0105854 A1 5/2011 Kiani et al.
2011/0116358 A9 5/2011 Li et al.
2011/0121964 A1 5/2011 Bannard
2011/0126188 A1 5/2011 Bernstein et al.
2011/0145570 A1 6/2011 Gressel et al.
2011/0169668 A1 7/2011 Henriksson
2011/0181443 A1 7/2011 Gutierrez et al.
2011/0221568 A1 9/2011 Giobbi
2011/0227740 A1 9/2011 Wohltjen
2011/0238517 A1 9/2011 Ramalingam et al.
2011/0246790 A1 10/2011 Koh et al.
2011/0266348 A1 11/2011 Denniston, Jr.
2011/0307599 A1 12/2011 Saretto et al.
2012/0016305 A1 1/2012 Jollota et al.
2012/0028609 A1 2/2012 Hruska
2012/0030006 A1 2/2012 Yoder et al.
2012/0069776 A1 3/2012 Caldwell et al.
2012/0086571 A1 4/2012 Scalisi et al.
2012/0161936 A1* 6/2012 Yoon ................ G06K 19/07309 340/10.1
2012/0182123 A1 7/2012 Butler et al.
2012/0212322 A1 8/2012 Idsoe
2012/0226451 A1 9/2012 Bacot et al.
2012/0226565 A1 9/2012 Drozd
2012/0226907 A1 9/2012 Hohberger et al.
2012/0238287 A1 9/2012 Scherzer
2012/0278188 A1 11/2012 Attar et al.
2012/0300753 A1 11/2012 Brown et al.
2012/0310720 A1 12/2012 Balsan et al.
2013/0019295 A1 1/2013 Park et al.
2013/0019323 A1 1/2013 Arvidsson et al.
2013/0044111 A1 2/2013 Vangilder et al.
2013/0095762 A1 4/2013 Inagaki et al.
2013/0111543 A1 5/2013 Brown et al.
2013/0135082 A1 5/2013 Xian et al.
2013/0179201 A1 7/2013 Fuerstenberg et al.
2013/0219186 A1 8/2013 Giobbi et al.
2013/0276140 A1 10/2013 Coffing et al.
2013/0277425 A1 10/2013 Sharma et al.
2013/0297514 A1 11/2013 Giobbi
2013/0312082 A1 11/2013 Izu et al.
2013/0315210 A1 11/2013 Brown et al.
2013/0331063 A1 12/2013 Cormier et al.
2014/0074696 A1 3/2014 Glaser
2014/0085479 A1 3/2014 Haas et al.
2014/0147018 A1 5/2014 Argue et al.
2014/0207686 A1 7/2014 Experton
2014/0256511 A1 9/2014 Smith
2014/0266604 A1 9/2014 Masood et al.
2014/0266713 A1 9/2014 Sehgal et al.
2014/0337920 A1 11/2014 Giobbi
2015/0026480 A1 1/2015 Giobbi et al.
2015/0039451 A1 2/2015 Bonfiglio
2015/0138330 A1 5/2015 Krishnamoorthi
2015/0294293 A1 10/2015 Signarsson
2015/0301155 A1 10/2015 Roisen et al.
2015/0310385 A1 10/2015 King et al.
2015/0310440 A1 10/2015 Hynes et al.
2016/0005020 A1 1/2016 Fernando et al.
2016/0027138 A1 1/2016 Larsen
2016/0093081 A1 3/2016 Kim et al.
2016/0133123 A1 5/2016 Giobbi et al.
2016/0171200 A1 6/2016 Giobbi
2016/0203349 A1 7/2016 Giobbi
2016/0205682 A1 7/2016 Brown et al.
2016/0210614 A1 7/2016 Hall
2016/0300236 A1 10/2016 Wiley et al.
2016/0306956 A1 10/2016 Giobbi
2017/0041315 A1 2/2017 Giobbi
2017/0085564 A1 3/2017 Giobbi et al.
2017/0091548 A1 3/2017 Agrawal et al.
2017/0221327 A1 8/2017 Wu et al.
2017/0270738 A1 9/2017 Giobbi
2017/0309165 A1 10/2017 Brown et al.
2017/0353500 A1 12/2017 Jacobsen et al.
2018/0019998 A1 1/2018 Giobbi
2018/0129799 A1 5/2018 Giobbi
2018/0322718 A1 11/2018 Qian et al.
2018/0357475 A1 12/2018 Honda et al.
2019/0065721 A1 2/2019 Giobbi
2019/0087612 A1 3/2019 Sengstaken, Jr.
2019/0172281 A1 6/2019 Einberg et al.
2019/0260724 A1 8/2019 Hefetz et al.
2019/0289562 A1 9/2019 Brown
2020/0020216 A1 1/2020 Slavin et al.
2020/0351873 A1 11/2020 Brown et al.
2021/0099952 A1 4/2021 Sengupta et al.
2021/0219869 A1 7/2021 Ryu et al.
2021/0241592 A1 8/2021 Allen et al.
2022/0091420 A1 3/2022 Woods et al.
2022/0210643 A1 6/2022 Hynds et al.
2022/0240050 A1 7/2022 Christensen et al.
2025/0093521 A1 3/2025 Czarnecky et al.

FOREIGN PATENT DOCUMENTS

EP 1600885 A1 11/2005
EP 2937805 A1 10/2015
JP 10-049604 A 2/1998
KR 10-2007-0060937 A 6/2007
WO 90/06633 A1 6/1990
WO 99/56429 A1 11/1999
WO 00/62505 A1 10/2000
WO 01/22724 A1 3/2001
WO 01/35334 A1 5/2001
WO 01/48714 A1 7/2001
WO 01/75876 A1 10/2001
WO 01/77790 A1 10/2001
WO WO/2002/067009 8/2002
WO 2004/010774 A1 2/2004
WO 2004/038563 A2 5/2004
WO 2004/042563 A2 5/2004
WO 2005/031663 A2 4/2005
WO 2005/050450 A1 6/2005
WO 2005/086802 A2 9/2005
WO 2005/104584 A1 11/2005
WO 2007/008540 A2 1/2007
WO 2007/081947 A2 7/2007
WO 2007/087558 A2 8/2007

OTHER PUBLICATIONS

Fasca, "S3, Via Formalize Agreement," Electronic News, The Circuit, 45(45, Nov. 8, 1999), p. 20.

Fasca, Chad, "The Circuit," Electronic News, 45(45) (Nov. 8, 1999), 20.

Feng Bao, et al., "Design of portable mobile devices based e-payment system and e-ticketing system with digital signature," 2001 International Conferences on Info-Tech and Info-Net. Proceedings (Cat. No.01 EX479), Beijing, China, 2001, pp. 7-12 vol. 6, doi: 10.1109/ICII.2001.982996. (Year: 2001).

Freescale Semicondutor, Inc., "Freescale Events," see ZigBee Open House Event, Aug. 18, 2004, 6 pgs., archived at https://web.archive.

(56) References Cited

OTHER PUBLICATIONS org/web/20040909082726/https://www.freescale.com/webapp/sps/site/overview.jsp?nodeId=02XPgQ7JgbBqJQ#zigbee_openhouse_04.

Freescale Semiconductor, Inc., "Overview," ZigBee General Information, at least as early as Aug. 17, 2004, 1 pg., archived at https://web.archive.org/web/20040817210006/http:/www.freescale.com/webapp/sps/site/overview.jsp? nodeId=02XPgQhHPRjdyB37087725.

Freescale Semiconductor, Inc., "ZigBeeTM," Freescale Semiconductor Wireless Standards, at least as early as Aug. 18, 2004, 2 pgs., archived at https://web.archive.org/web/20040818075046/http:/www.freescale.com/webapp/sps/site/overview.jsp? nodeId=02XPgQhHPRjdyB.

Freescale Semiconductor, Inc., "ZigBeeTM," Freescale Semiconductor Wireless Standards, at least as early as Jun. 11, 2004, 2 pgs., archived at https://web.archive.org/web/20040611051834/http:/e-www.motorola.com/webapp/sps/site/overview.jsp?nodeId=02XPgQhHPRjdyB.

Freescale Semiconductor, Inc., "Freescale's ZigBeeTM-ready Platform Wins Sensors Magazine Best of Sensors Expo Award," Freescale Semiconductor Wireless, at least as early as Aug. 17, 2004, 1 pg., archived at https://web.archive.org/web/20040817203409mp_/http:/www.freescale.com/webapp/sps/site/overview.jsp? nodeId=02XPgQ6988.

Freescale Semiconductor, Inc., "ZigBee Alliance Successfully Concludes First Multi-node Network Test," press release, Jul. 6, 2004, 2 pgs., archived at https://web.archive.org/web/20040717113733/http:/www.zigbee.org/documents/First-Multi-Node_Testing_FINAL_000.pdf.

Freescale Semiconductor, Inc., "ZigBeeTM Technology from Freescale," Freescale Semiconductor, Inc. white paper, 2004, 4 pgs., archived at https://web.archive.org/web/20050513024652/http:/www.freescale.com/files/wireless comm/doc/brochure/BRZIGBEETECH.pdf.

Freescale Semiconductor, Inc., "ZRP-1 : ZigBee-ready Platform," at least as early as Oct. 19, 2005, 6 pgs., archived at https://web.archive.org/web/20051019122919/http://www.freescale.com/webapp/sps/site/prod_summary.jsp?code=ZRP-1 &nodeId=02XPgQhCQ6m6cy7103.

Freescale Semiconductor, Inc., M68HC08 microcontroller ordering web page, at least as early as Aug. 17, 2004, 5 pgs., archived at https://web.archive.org/web/20040817014804/http:/www.freescale.com/webapp/sps/site/taxonomy.jsp? NodeId=01 624684498634.

Giobbi, Specification of U.S. Appl. No. 60/824,758, filed Sep. 6, 2006, all pages.

Govindan et al. "Real Time Security Management Using RFID, Biometric and Smart Messages." 2009 3rd International Conference on Anti-Counterfeiting, Security, and Identification in Communication, Aug. 20, 2009, pp. 282-285.

Gralla, "How the Internet works," Millennium Edition, 1999, Que Corporation, Indianapolis, IN, all pages.

Hendron, "File Security, Keychains, Encryptioin, and More with Mac OS X (10.3+)" Apr. 4, 2005, downloaded from http://www.johnhendron.net/documents/OSX_Security.pdf on or before May 3, 2012, 30 pgs.

Hester et al., "neuRFon(TM) Netform: A Self-Organizing Wireless Sensor Network", Oct. 14, 2002, Proceedings of the Eleventh International Conference on Computer Communications and Networks, pp. 364-369.

Honkanen et al., "Low End Extension for Bluetooth", Sep. 19, 2004, Proceedings of the 2004 IEEE Radio and Wireless Conference, Atlanta, GA, pp. 199-202.

IBM Corporation, "Tadlys' Bluetooth Wireless Local Network for Hotspots," Wireless e-business, at least as early as May 6, 2004, 2 pgs., archived at https://web.archive.org/web/20040508123915/http://www.tadlys.com/media/downloads/Hotspots%20PVDEE01006-3.pdf.

IEEE Computer Society, "IEEE Std 802.15.4 (Trade Mark)—Part 15.4: Wireless Medium Access Control (MAC) and Physical Layer (PHY) Specifications for Low-Rate Wireless Personal Area Networks (LR-WPANs)," The Institute of electrical and Electronics Engineers, Inc., New York, NY, Oct. 1, 2003, 679 pgs.

IEEE, "IEEE 802.15 WPANTM Task Group 4 (TG4)" exemplary web page, Aug. 24, 2004, 2 pgs., archived at https://web.archive.org/web/20040824085452/http:/www.ieee802.org/15/pub/TG4.html.

International Search Report and Written Opinion for International Application No. PCT/US04/38124, mailed Apr. 7, 2005, 10 pgs.

International Search Report and Written Opinion for International Application No. PCT/US05/00349, mailed Mar. 19, 2008, 10 pgs.

International Search Report and Written Opinion for International Application No. PCT/US05/07535, mailed Dec. 6, 2005, 6 pgs.

International Search Report and Written Opinion for International Application No. PCT/US05/43447, mailed Feb. 22, 2007, 7 pgs.

International Search Report and Written Opinion for International Application No. PCT/US05/46843, mailed Mar. 1, 2007, 10 pgs.

International Search Report and Written Opinion for International Application No. PCT/US07/11102, mailed Oct. 3, 2008, 11 pgs.

International Search Report and Written Opinion for International Application No. PCT/US07/11103, mailed Apr. 23, 2008, 9 pgs.

International Search Report and Written Opinion for International Application No. PCT/US07/11104, mailed Jun. 26, 2008, 9 pgs.

International Search Report and Written Opinion for International Application No. PCT/US07/11105, mailed Oct. 20, 2008, 10 pgs.

International Search Report and Written Opinion for International Application No. PCT/US08/83060, mailed Dec. 29, 2008, 9 pgs.

International Search Report and Written Opinion for International Application No. PCT/US08/87835, mailed Feb. 11, 2009, 8 pgs.

International Search Report and Written Opinion for International Application No. PCT/US09/34095, mailed Mar. 25, 2009, 11 pgs.

International Search Report and Written Opinion for International Application No. PCT/US2009/039943, mailed Jun. 1, 2009, 9 pgs.

International Search Report and Written Opinion for International Application No. PCT/US2014/037609, mailed Dec. 9, 2014, 13 pgs.

International Search Report received for PCT Patent Application No. PCT/US2001/049916, mailed on Apr. 25, 2002, 1 page.

Jeyaprakash et al., "Secured Smart Card Using Palm Vein Biometric On-Card-Process," 2008 International Conference on Convergence and Hybrid Information Technology, 2008, pp. 548-551.

Jonker et al., "Digital rights management in consumer electronics products," IEEE Signal Processing Magazine, vol. 21, No. 2, pp. 82-91, Mar. 2004, doi: 10.1109/MSP.2004.1276116.

Katz et al., "Smart Cards and Biometrics in Privacy-Sensitive Secure Personal Identification System," May 2002, Smart Card Alliance, p. 1-29.

Kontzer, "Thomson Bets on Smart Cards for Video Encryption," www.informationweek.com, Jun. 7, 2001, 1 pg.

Korzeniowski, "First Intelligent, Wireless Consumer Devices About to Hit Market," TechNewsWorid, Jul. 28, 2004, 3 pgs., archived at https://web.archive.org/web/20040821061130/http:/www.technewsworid.com/story/35376.html%20com/.

Kuhn et al., Introduction to Public Key Technology and the Federal PKI Infrastructure, Feb. 26, 2001, National Institute of Standards and Technology, 54 pgs.

Labrou et al., "Wireless Wallet," Proceedings of the First Annual International Conference on Mobile and Ubiquitous Systems: Networking and Services (MobiQuitos '04), IEEE, Aug. 22-26, 2004, 10 pgs.

Lake, "Downloading for Dollars: Who said buying music off the Net would be easy?" Sound & Vision, Nov. 2000, pp. 137-138.

Lee et al., "Effects of dielectric superstrates on a two-layer electromagnetically coupled patch antenna," Digest on Antennas and Propagation Society International Symposium, 1989, pp. 620-623 vol. 2, doi: 10.1109/APS.1989.134763.

Lewis, "Sony and Visa in On-Line Entertainment Venture," New York Times, vol. 145, Thurs. Ed., Nov. 16, 1995, 1 pg.

Liu et al., "A Practical Guide to Biometric Security Technology, " IT Pro, vol. 3, No. 1, Jan./Feb. 2001, pp. 27-32.

Lockton et al., RFID: The next serious threat to privacy, Ethics and Information Technology (2005) 7:221-231 (Year: 2006).

Machine translation of JPH10049604, 27 pages.

Wallace, "The Internet Unplugged," InformationWeek, vol. 765, No. 22, Dec. 13, 1999, pp. 22-24.

(56) References Cited

OTHER PUBLICATIONS

Weber, "In the Age of Napster, Protecting Copyright is a Digital Arms Race," Wall Street Journal, Eastern ed., Jul. 24, 2000, p. B1.
White, "How computers Work," Millennium Edition, 1999, Que Corporation, Indianapolis, IN, all pages.
Yoshida, "Content Protection Plan Targets Wireless Home Networks," EE Times, Jan. 11, 2002, retrieved from www.eetimes.com/story/OEG20020111S0060 on Mar. 4, 2002, 2 pgs.
Zhang et al., "A User-Centric M-Payment Solution," The ISG-Smart Card Centre and the Information Security Group, Royal Holloway, University of London, Egham, Surrey, TW20 0EX, UK, 2005, 8 pgs.
Zigbee Alliance, "The ZigBeeTM Buzz is Growing: New Low-Power Wireless Standard Opens Powerful Possibilities," Electronic Design, Jan. 12, 2004, 12 pgs., archived at https://web.archive.org/web/20040411172015/ http:/www.elecdesign.com/Files/29/7186/7186_01.pdf.
Zigbee Alliance, "Welcome to the ZigBeeTM Alliance," exemplary web page, at least as early as Sep. 24, 2004, 2 pgs., archived at https://web.archive.org/web/20040924045517/http://zigbee.org/.
Zigbee Alliance, "ZigBee Specification," ZigBee Document 053474r06, Version 1.0, Dec. 14, 2004, 378 pgs.
Zigbee Alliance, "ZigBeeTM Positioned to Drive Wireless Networking in Building Automation, Industrial and Residential Control and Sensors Markets in 2004," press release, Feb. 17, 2004, 3 pgs., archived at https://web.archive.org/web/20040423220244/http:/www.zigbee.org/documents/04036r5ZB_MWG-Momentum-Release_FINAL.pdf.
"How to find the serial number on TP-Link devices," https://www.tp-link.com/us/support/faq/503/ (last visited Apr. 15, 2024), 3 pgs.
Google Pixel Serial Number Guide, HomeServe webpage, https://www.homeserve.com/en-us/customers/find-serial-numberdevice-type/google/, 3 pgs.
Product Identification Codes, https://www.uc.edu/content/dam/uc/ce/docs/OLLI/Page%20Content/PRODUCT%20IDENTIFICATION%20CODES%20BAR%20QR.pdf, last visited Apr. 19, 2024, 88 pgs.
Specification of the Bluetooth System, Wireless Connections Made Easy, v 1.0 B, Dec. 1, 1999, 440 pgs., Dec. 1, 1999.
UK IT Security Evaluation and Certification Scheme, UK IT Security Evaluation and Certification Scheme, Certification Report No. P165, Sony FeliCa Contactless Smart Card, Issue 1.0, Mar. 2002, 27 pgs., Mar. 1, 2002.
"IEEE." IEEE Standards: Get IEEE 801 (TM) Wireless Lans IEEE 802, 2004, web.archive.org/web/200404141121 001 standards. ieee. org:80/getieee802.
"802.15.3b Part 15.3: Wireless Medium Access Control (MAC) and Physical Layer (PHY) Specifications for High Rate Wireless Personal Area Networks (WPANs)." IEEE-SA Standards Board, May 5, 2006.
"Get IEEE 802 Update." Nov. 9, 2018. 8 pgs.
"IEEE Standards Association." Terms of Use for IEEE Standards Publications Delivered in Electronic Form, IEEE, 2005, https://web.archive.org/web/20050529084555/standards.ieee.org:80/getieee802/download/.
"IEEE." "get IEEE 802"(Tm) Home Page, 2003, web.archive.org/web/20031008112815/standards.ieee.org:80/getieee802/.
"IEEE." Welcome to Standards Information Network, Jun. 3, 2004, web.archive.org/web/20040603154924/standards.ieee.org:80/standardspress/.
Cai, et al. "A Novel Design of IEEE 802.15.3 Mac over UWB." IEEE 60th Vehicular Technology Conference, 2004. VTC2004-Fall. 2004, vol. 7, pp. 5297-5301, doi:10.1109/vetecf.2004.1405113.
Cooklev, Todor. "A Study of IEEE 802.11, 802.15, and 802.16." Wireless Communication Standards, Standards Information Network, IEEE Press, New York, NY, 2004, pp. 1-200.
Gilb, James P. K. "Draft Running Comment Resolution." IEEE P802.15 Working Group for Wireless Personal Area Networks (WPANs), Oct. 10, 2004, pp. 1-27.
Gilb, James P. K. Wireless Multimedia: A Guide to the IEEE 802.15.3 Standard. Standards Information Network, IEEE Press, 2004.
Guo, et al. "Intra-Superframe Power Management for IEEE 802.15.3 WPAN." IEEE Communications Letters, vol. 9, No. 3, Mar. 2005, pp. 228-230, doi: 10.1109/lcomm.2005.03023.
IEEE Computer Society, "IEEE Std 802.15.3—Part 15.3: Wireless Medium Access Control (MAC) and Physical Layer (PHY) Specifications for High Rate Wireless Personal Area Networks (WPANs)," The Institute of electrical and Electronics Engineers, Inc., New York, NY, Oct. 1, 2003, 324 pgs.
Petition for Inter Partes Review of U.S. Pat. No. 10,698,989, Mar. 18, 2025, 99 pgs.
Petition for Inter Partes Review of U.S. Pat. No. 8,219,129, Dec. 23, 2024, 102 pgs.
Petition for Inter Partes Review of U.S. Pat. No. 8,457,672, Dec. 23, 2024, 94 pgs.
Petition for Inter Partes Review of U.S. Pat. No. 9,049,188, Feb. 7, 2025, 84 pgs.
Petition for Inter Partes Review of U.S. Pat. No. 9,265,043, Dec. 23. 2024, 94 pgs.
Wang et al. "Comparison of IEEE 802.11e and IEEE 802.15.3 MAC," 2004, pp. 675-680.
ZENG RanRan and Kuo, Geng-Sheng. "A Novel Scheduling Scheme and Mac Enhancements for IEEE 802.15.3 High-Rate Wpan." IEEE Wireless Communications and Networking Conference, 2005, vol. 4, pp. 2478-2483, doi:10.1109/wcnc.2005.1424903.
Machine generated English translation of JPH10049604 Shimadzu Corp.published Feb. 20, 1998. 33 pages, downloaded from Espacenet on Nov. 13, 2017.
Tadlys Ltd., "Wireless Museum Information," at least as early as Dec. 12, 2005, 2 pgs., archived at https://web.archive.org/web/20051212162456/http://www.tadlys.com/media/downloads/Tadlys_wireless_museum_network.pdf.
Tadlys Ltd., "Corporate Systems," at least as early as Nov. 1, 2004, 2 pgs., archived at https://web.archive.org/web/20041101095441/http://www.tadlys.com/media/downloads/Corporate_network.pdf.
Thomson Multimedia, "Thomson multimedia unveils copy protection proposal designed to provide additional laye of digital content security," retrieved from www.thompson-multimedia.com/GB/06/c01/010530.htm on Mar. 4, 2002, May 30, 2001, 2 pgs.
Thongthammachart et al., "Bluetooth Enables In-door Mobile Location Services," Proceedings of the 57th IEEE Semiannual Vehicular Technology Conference, Apr. 22-25, 2003, 5 pgs.
University of Birmingham, "Prism: Probabilistic Symbolic Model Checker," at least as early as Aug. 3, 2004, 3 pgs., archived at https://web.archive.org/web/20040803193058/http://www.cs.bham.ac.uk/~dxp/prism/casestudies/index.html.
Unixhelp, "What is a file?" Apr. 30, 1998, retrieved from unixhelp.ed.ac.uk/editors/whatisafile.html accessed Mar. 11, 2010 via http://waybackmachine.org/19980615000000*/http://unixhelp.ed.ac.uk/editors/whatisafile.html on Mar. 11, 2011, 1 pg.
Vainio, "Bluetoolh Security," Helsinki University of Technology, May 25, 2000, 17 pgs.
Van Winkle, "Bluetooth: The King of Connectivity," Laptop Buyer's Guide and Handbook, Jan. 2000, pp. 148-153.
Wade, "Using Fingerprints to Make Payments at POS Slowly Gaining Popularity," Credit Union Journal, International Biometric Group, Apr. 21, 2003, retrieved from http://www.biometricgroup.com/in_the_news/04.21.03.html on Jan. 7, 2007, 3 pgs.
Blip Systems, "BlipManager," at least as early as May 17, 2004, 1 pg., archived at https://web.archive.org/web/20040517050728/http:/www.blipsystems.com/Default.asp?ID=11.
Blip Systems, "BlipMobility," at least as early as Apr. 7, 2004, archived at https://web. archive. org/web/20040407212934/http:/www. blipsystems. com/Default.asp?ID=1 18.
Blip Systems, "BlipNet API," at least as early as May 18, 2004, 1 pg., archived at https://web.archive.org/web/20040518060132/http:/www.blipsystems.com/Default.asp?ID=92.
Blip Systems, "BlipNet Explore a wireless world . . . of great opportunities," brochure available Sep. 2002, 6 pgs., availabe online at https://web.archive.org/web/20031012184406/http:/www.blipsystems.com/products_blipnet.shtml.

(56) References Cited

OTHER PUBLICATIONS

Blip Systems, "BlipNet Technical Overview," Mar. 2003, 30 pgs., archived at https://web.archive.org/web/20031012184406/http:/www.blipsystems.com/products_blipnet.shtml.
Blip Systems, "BlipNode," at least as early as May 16, 2004, 1 pg., archived at https://web.archive.org/web/20040516001554/http:/www.blipsystems.com/Default.asp?ID=10.
Blip Systems, "BlipServer," at least as early as May 17, 2004, 1 pg., archived at https://web.archive.org/web/20040517044955/http:/www.blipsystems.com/Default.asp?ID=9.
Blip Systems, "Bluetooth Networks: Products: Bluetooth infracture," product description, at least as early as Oct. 2003, archived at https://web.archive.org/web/20031012184406/http:/www.blipsystems.com/products_blipnet.shtml.
Blip Systems, "Product Information—BlipNet—Presentation of BlipNet 1.0—A Bluetooth Access System," Aug. 2002, 2 pgs., archived at https://web.archive.org/web/20031012184406/http:/www.blipsystems.com/products_blipnet.shtml.
Blip Systems, BlipMobihty, at least as early as Apr. 7, 2004, archived at https://web. archive. org/ web/20040407212934/http:/www. blipsystems.com/Default.asp?ID=1 18.
Blueproximity, "BlueProximity—Leave it—it's locked, come back, it's back too . . . " Aug. 26, 2007, retrieved from http://blueproximity.sourceforge.net/viahttp://www.archive.org/ on or before Oct. 11, 2011, 1 pg.
Malan, "Here come Wireless Sensors," Machine Design, Jun. 10, 2004, 3 pgs., archived at https://web.archive.org/web/20040610131354/http:/www.machinedesign.com/ASP/viewSelectedArticle.asp?strArticleId=56796&strSite=MDSite&Screen=CURRENTISSUE.
Mciver et al., "Identification and Verification Working Together," Bioscrypl, While Paper: Identification and Verification Working Together, Aug. 27, 2004, retrieved from www.ibia.org/membersadmin/whilepapers/pdf/15/Identification%20and%20Verification%20Working%20Together.pdf on Jan. 7, 2007, 5 pgs.
Micronas, "Micronas and Thomson Multimedia Showcase a New Copy Protection System that Will Drive the Future of Digital Television," www.micronas.com: Jan. 8, 2002, 3 pgs.
Mit Computer Science and Artificial Intelligence Laboratory, "Cricket v2 User Manual," Cricket Project, MIT Computer Science and Artificial Intelligence Lab, Cambridge, MA, Jan. 2005, 57 pgs., available online at https://web.archive.org/web/20041206144922/http:/cricket.csail.mit.edu/v2man.html.
Motorola, Inc., "Motorola First to Demonstrate ZigBee 2.4 GHz Wireless Networking Technology," press release, Mar. 27, 2003, 2 pgs., archived at https://web.archive.org/web/20050205053308/http:/www.motorola.com/mediacenter/news/detail/0, 1958,2743_2228 23,00.html.
Muller, "Desktop Encyclopedia of the Internet," 1999, Artech House Inc., Norwood, MA, all pages.
Nel et al., "Generation of Keys for use with the Digital Signature Standard (DSS)," Communications and Signal Processing, Proceedings of the 1993 IEEE South African Symposium, Aug. 6, 1993, pp. 6-11.
Nerd Vitiles, "magicJack: Could It Be the Asterisk Killer?" Aug. 1, 2007, retrieved from http://nerdvillles.com/index.php7p=187 on or before Oct. 11, 2011, 2 pgs.
Nilsson et al., "Match-on-Card for Java Cards," Precise Biometrics, white paper, Apr. 2004, retrieved from www.ibiaorg/membersadmin/whitepapers/pdf/17/Precise%20Match-on-Card%20for%20Java%20Cards.pdf on Jan. 7, 2007, 5 pgs.
Noore, "Highly Robust Biometric Smart Card Design." IEEE Transactions on Consumer Electronics, vol. 46, No. 4, Nov. 2000, pp. 1059-1063.
Nordin, "Match-on-Card Technology," Precise Biometrics, white paper, Apr. 2004, retrieved from www.ibiaorg/membersadmin/whitepapers/pdf/17/Precise%20Match-on-Card%20technology.pdf on Jan. 7, 2007, 7 pgs.
Nordin, "Match-on-Card Technology," Precise Biometrics, white paper, Apr. 2004, retrieved from www.ibia.org/membersadmin/whitepapers/pdf/17/Precise%20Match-on-Card%2otechnology.pdf on Jan. 7, 2007, 7 pgs.
Paget, "The Security Behind Secure Extranels," Enterprise Systems Journal, vol. 14, No. 12, Dec. 1999, 4 pgs.
Pash, "Automate proximity and location-based computer actions," Jun. 5, 2007, retrieved from http://lifehacker.com/265822/automate-proximity-and-location+based-computer-actionson or before Oct. 11, 2011, 3 pgs.
PCT International Preliminary Report and Written Opinion of the International Searching Authority, Application No. PCT/US2008/087835, mailing date Jul. 1, 2010, 8 pages.
Petition for Inter Partes Review of U.S. Pat. No. 10,698,989, Aug. 26, 2021, 3356 pgs.
Petition for Inter Partes Review of U.S. Pat. No. 8,352,730, Aug. 26, 2021, 2450 pgs.
Petition for Inter Partes Review of U.S. Patent No. 9,049, 188, Aug. 26, 2021, 800 pgs.
Petition for Inter Partes Review of U.S. Pat. No. 9,235,700, Aug. 26, 2021, 466 pgs.
Petition for Inter Partes Review of U.S. Pat. No. 9,298,905, Aug. 26, 2021, 1941 pgs.
Pope et al., "Oasis Digital Signature Services: Digital Signing without the Headaches," IEEE Internet Computing, vol. 10, Sep./Oct. 2006, pp. 81-84.
Priyantha, "The Cricket Indoor Location System," Ph.D. thesis submitted to Department of Electrical Engineering and Computer Science, Massachusetts Institute of Technology, Jun. 2005, 199 pgs.
Request for Ex Parte Reexamination of U.S. Pat. No. 10,698,989, Jun. 8, 2022, 1505 pgs.
Request for Ex Parte Reexamination of U.S. Pat. No. 8,352,730, Jun. 8, 2022, 1401 pgs.
Request for Ex Parte Reexamination of U.S. Pat. No. 9,298,905, Jun. 8, 2022, 1123 pgs.
Rodriguez et al., "In-building location using Bluetooth," Proceedings of the International Workshop on Wireless Ad-Hoc Networks (IWWAN 2005), May 23-26, 2005, London, England, 7 pgs.
Saflink Corporation, "SAFModule (Trademark): A Look Into Strong Authentication," white paper, retrieved from www.ibia.org/membersadmin/whilepapers/pdf/6/SAFmod_WP.pdf on Jan. 7, 2007, 8 pgs.
Sapsford, "E-Business: Sound Waves Could Help Ease Web-Fraud Woes," Wall Street Journal, Aug. 14, 2000, p. B1.
Schneier, Applied Cryptography, Second Edition: Protocols, Algorithms, and Source Doe in C, Jan. 1, 1996, John Wley & Sons, Inc., 1027 pgs.
Serrao et al., "Protecting Digital Music Delivery and Consumption using the OCCAMM Project Framework," Proceedings of the Second International Conference on Web Delivering of Music, 2002, pp. 38-45, doi: 10.1109/WDM.2002.1176192.
Singh et al. "A Constraint-Based Biometric Scheme on ATM and Swiping Machine." 2016 International Conference on Computational Techniques in Information and Communication Technologies (ICCTICT), Mar. 11, 2016, pp. 74-79.
Smart Card Alliance, "Alliance Activities: Publications: Identity: Identity Management Systems, Smart Cards anc Privacy," 1997-2007, retrieved from www.smartcardalliance.org/pages/publications-identity on Jan. 7, 2007, 3 pgs.
Smart Card Alliance, "Contactless Technology for Secure Physical Access: Technology and Standards Choices," Smart Card Alliance, Oct. 2002, pp. 1-48.
Smart Card Alliance, "Smart Cards and Biometrics White Paper: Smart Card Alliance," May 2002, retrieved from http://www.securitymanagement.com/library/smartcard faqtech0802.pdf on Jan. 7, 2007, 7 pgs.
Smart Card Alliance, Contactless Payment and the Retail Point of Sale: Applications, Technologies and Transaction Models, Mar. 1, 2003, a Smart Card Alliance Report, 50 pgs.
Smart Card Alliance, Smart Card Alliance—The Alliance, Jan. 22, 2001, http://www.smartcardalliance.org, 1 pg.

(56) References Cited

OTHER PUBLICATIONS

Splashid, "SplashID—Secure Password Manager for PDA's and Smartphones," Mar. 8, 2007, retrieved from http://www.splashdata/com/splashid/ via http://www.archive.org/ on or before Oct. 11, 2011, 2 pgs.
Srivastava, "Is internet security a major issue with respect to the slow acceptance rate of digital signatures," Jan. 2, 2005, Computer Law & Security Report, pp. 392-404.
Tadlys Ltd., "Hotspot' Gaming Arcade," at least as early as Dec. 9, 2004, 2 pgs., archived at https://web.archive.org/web/20041209234518/http://www.tadlys.com/media/downloads/Tadlys_gaming_arcade.pdf.
Tadlys Ltd., "About Tadlys," at least as early as Apr. 5, 2001, 1 pg., archived at https://web.archive.org/web/20010405044249/http:/www.tadlys.com/about.html.
Tadlys Ltd., "An Advertisers' Dream—From direct marketing to sales," Nov. 2004, 2 pgs., archived at https://web.archive.org/web/20041101092944/http://www.tadlys.com/media/downloads/m-commerce_app.pdf.
Tadlys Ltd., "Bluetooth Glossary," at least as early as Jun. 2004, 12 pgs., archived at https://web.archive.org/web/20040531082349/http://www.tadlys.com/pages/Downloads_content.asp?intGloballd=1.
Tadlys Ltd., "First Demo of Distribution and Redemption of e-Coupons over Bluetooth," Tadlys Company News anc Events, Jun. 5, 2001, 1 pg., archived at https://web.archive.org/web/20040601051516/http://tadlys.com/Pages/news_content.asp?iGlobalID=17.
Tadlys Ltd., "Indoor Location Networks," at least as early as Apr. 3, 2004, 1 pg., archived at https://web. archive.org/web/20040403200221/http:/www.tadlys.com/Pages/Product_content.asp?iGlobalId=2.
Tadlys Ltd., "Operator Systems," at least as early as Nov. 1, 2004, 2 pgs., archived at https://web.archive.org/web/20041101101402/http://www.tadlys.com/media/downloads/operator_network.pdf.
Tadlys Ltd., "Tadlys Announces Range of Bluetooth Access Network Solutions," Tadlys Company News and Events, Jan. 22, 2001, 1 pg., archived at https://web.archive.org/web/20040624122319/http://www.tadlys.com/Pages/news_content.asp?iGlobalID=16.
Tadlys Ltd., "Tadlys' Wire free networking solutions," Feb. 2001, 2 pgs., archived at https://web.archive.org/web/20010204012700/http:/www.tadlys.com/solutions.html.
Tadlys Ltd., "Wireless hospital network," at least as early as Jul. 1, 2004, 2 pgs., archived at https://web.archive.org/web/20040701105046/http://www.tadlys.com/media/downloads/tadlys_hospital_wireless_network.pdf.
Adams, "Designing with 802.15.4 and Zigbee," presented at Industrial Wireless Applications Summit, San Diego, California, Mar. 9, 2004, 22 pgs.
Adams, "Meet the ZigBee Standard," Sensors Online, Jun. 2003, 7 pgs., archived at https://web.archive.org/web/20031008191032/http:/sensorsmag.com/articles/0603/14/pf_main.shtml.
Adams, "Zigbee vital in industrial applications," EE Times, Jul. 29, 2003, 3 pgs., archived at https://web.archive.org/web/20031013062940/http:/www.eetimes.com/story/OEG20030727S0002.
Agourare et al., "Authentication and location control via RFID analysis,"2009 IEEE Conference on Emerging Technologies & Factory Automation, Sep. 1, 2009, 8 pgs.
Anonymous, "Applying Biometrics to Door Access," Security Magazine, Sep. 26, 2002, retrieved from http://www.securitymagazine.com/CDA/Articles/Technologies/3ae610eaa34d8010VgnVCM100000f932a8cO on Jan. 7, 2007, 5 pgs.
Anonymous, "BluePayz: A Seamless Payment Method Using Bluetooth-Enabled Mobile Phones," IP.com Publication Date 2003-Jun. 20, 2003, https://priorart.ip.com/1 PCOM/000015495 (Year: 2003).
Anonymous, "Firecrest Shows Flow Truly Commercially-Minded Companies Will Exploit the Internet," Computergram International, Jan. 18, 1996, 2 pgs.
Anonymous, "IEEE 802.15.4-2006—Wikipedia, the free encyclopedia," Wikipedia, last modified Mar. 21, 2009, retrieved from http://en.wikipedia.org/wiki/IEEE_802.15.4-2006 on Apr. 30, 2009, 5 pgs.
Antonoff, "Visiting Video Valley," Sound & Vision, Nov. 2001, pp. 116, 118-119.
Apple et aL, "Smart Card Setup Guide," 2006, downloaded from http://manuals.info.apple.com/en_US/Smart_Card_Setup_Guide. pdf on or before May 3, 2012, 16 pgs.
Balanis, "Antenna Theory: A Review,"Jan. 1992, Proceedings of the IEEE, vol. 80, No. 1, p. 13.
Beaufour, "Personal Servers as Digital Keys," Proceedings of the Second IEEE Annual Conference on Pervasive Computing and Communications (PERCQM'04), Mar. 14-17, 2004, pp. 319-328.
Beaufour, "Personal Servers as Digital Keys," Proceedings of the Second IEEE Annual Conference on Pervasive Computing and Communications (PERCOM'04), Mar. 14-17, 2004, pp. 319-328.
Biopay, LLC, "Frequently Asked Questions (FAQs) About BioPay," retrieved from http://www.biopay.com/faqs-lowes.asp on Jan. 7, 2007, 5 pgs.
Blip Systems, "Mar. 8, 2004—Bluetooth at the office?" at least as early as Oct. 11, 2004, archived at https://web.archive.org/web/20041011094320/http:/www.blipsystems.com/Default.asp? ID=16&M=News&PID=25&NewsID=9.
Bluetooth Sig, Inc. "Specification of the Bluetooth System," Version 1.2, Nov. 5, 2003, 82 pgs., archived at https://web.archive.org/web/20031119092849/http:/www.bluetooth.com/dev/spec.v12.asp.
Bluetooth Sig, Inc., "Bluetooth," www.bluetooth.com, Jun. 1, 2000, 8 pgs.
Bluetooth Sig, Inc., "Say Hello to Bluetooth," retrieved from www.bluetooth.com, at least as early as Jan. 14, 2005, 4 pgs.
Blum, "Digital Rights Management May Solve the Napster 'Problem," Technology Investor, Oct. 2000, pp. 24-27.
Bohrsatom et al., "Automatically unlock PC when entering proximity," Dec. 7, 2005, retrieved from http://salling.com/forums/viewtopic.php?t=3190 on or before Oct. 11, 2011, 3 pgs.
Brown, "Techniques for Privacy and Authentication in Personal Communication Systems," Personal Communications, IEEE, Aug. 1995, vol. 2, No. 4, pp. 6-10.
Callaway, "Wireless Sensor Networks: Architectures and Protocols," book description, Motorola Labs, Auerbach Publications, Aug. 26, 2003, 3 pgs., archived at https://web.archive.org/web/20031023101953/http:/www.crcpress.com/shopping cart/products/product detail.asp? sku=AU1823.
Callaway, Wireless Sensor Networks: Architectures and Protocols, Jan. 1, 2004, Auerbach Publications, 366 pgs.
Chen et al."On Enhancing Biometric Authentication with Data Protection." KES2000. Fourth International Conference on Knowledge-Based Intelligent Engineering Systems and Allied Technologies. Proceedings (Cat. No.00TH8516), vol. 1, Aug. 1, 2000, pp. 249-252.
Chi et al., "Industrial Wireless Sensor Networking: A Market Dynamics Study," ON World, Jun. 28, 2004, 5 pgs., archived at https://web.archive.org/web/20040710182216/http:/onworld.com:80/html/industrialwirelesssensor.htm.
Cisco Systems, Inc., "Antenna Patterns and Their Meaning," 1992-2007, p. 10.
Costa, "Imation USB 2.0 Micro Hard Drive," Nov. 22, 2005, retrieved from http://www.pcmag.com/article2/0,2817, 1892209,00.asp on or before Oct. 11, 2011, 2 pgs.
Dagan, "Power over Ethernet (POE) Midspan—The Smart Path to Providign Power for IP Telephony," Product Manager, Systems, Aug. 2005, Power Dsine Inc., 28 pgs.
Dai et al., "Toward Blockchain-Based Accounting and Assurance," Journal of Information Systems, vol. 31, No. 3, Fal 2017, pp. 5-21.
Dai et al., Toward Blockchain-Based Accounting and Assurance, Journal of Information Systems, vol. 31, No. 3, Fai 2017, pp. 5-21.
David et al., Security Issues for Contactless Smart Cards, Sep. 1, 1997, conference paper, available online at https://link.springer.com/chapter/10.1007/BFb0054029, 6 pgs.
Debow, "Credit/Debit Debuts in Midwest Smart Card Test," Computers in Banking, vol. 6, No. 11, Nov. 1989, pp. 10-13.

(56) References Cited

OTHER PUBLICATIONS

Dennis, "Digital Passports Need Not Infringe Civil Liberties," Newsbytes, NA, Dec. 2, 1999, 2 pgs.
Derfler, "How Networks Work," Bestseller Edition, 1996, Ziff-Davis Press, Emeryville, CA, all pages.
Disclosed Anonymously (Method and Apparatus for Mobile Identity Authentication)., An IP.com Prior Art Database Technical IP.com No. IPCDM000194545D., IP.com Electronic Publication Date: Mar. 29, 2010 (Year: 2010).
Duflot et al., "A Formal Analysis of Bluetooth Device Discovery," presented at the 1st International Symposium on Leveraging Applications of Formal Methods (ISOLA'04), Oct. 30-Nov. 2, 2004, Paphos, Cyprus, and published in the International Journal on Software Tools for Technology Transfer 8, pp. 621-632, 16 pgs., https://doi.org/10.1007/sl0009-006-0014-x.
Dvorak, IEEE 802.15.4 and Zigbee Overview, Sep. 27, 2005, Motorola, 26 pgs.
Eshed, "Bluetooth Wireless Technology Application for the Retail Market," published at www.tadlys.com on May 2001, 8 pgs.
KR-20070060937—machine translation (Year: 2007).
ADT. "Apps and Data to Go on USB Drives", Jul. 2005. Retrieved from <https://adtmag.com/articles/2005/07/27/apps-and-data-to-go-on-usb-drives.aspx?p=1>. (Year: 2005).
Nadel, Brian. "SanDisk Cruzer Profile review: SanDisk Cruzer Profile", Apr. 2005. Retrieved from <https://www.cnet.com/reviews/sandisk-cruzer-profile-review/>. (Year: 2005).
Sever, Gil. "Don't get out-smarted by smart devices", Aug. 2007. Retrieved from <https://www.scworld.com/perspective/dont-get-out-smarted-by-smart-devices>. (Year: 2007).

* cited by examiner

PROXIMITY-SENSOR SUPPORTING MULTIPLE APPLICATION SERVICES

CROSS-REFERENCE TO RELATED APPLICATIONS

The present application is a continuation of and claims priority under 35 USC § 120 to U.S. application Ser. No. 18/150,441, filed Jan. 5, 2023, titled "Proximity-Sensor Supporting Multiple Application Services," which is a continuation of U.S. application Ser. No. 16/997,590, filed Aug. 19, 2020, titled "Proximity-Sensor Supporting Multiple Application Services," which is a continuation of U.S. application Ser. No. 15/643,734, filed Jul. 7, 2017, titled "Proximity-Sensor Supporting Multiple Application Services," which is a continuation of U.S. application Ser. No. 14/185,877, filed Feb. 20, 2014, titled "Proximity-Sensor Supporting Multiple Application Services", which is a continuation of U.S. application Ser. No. 12/268,397, filed Nov. 10, 2008, titled "Proximity-Sensor Supporting Multiple Application Services" and claims the benefit of priority under 35 U.S.C. § 119(e) of (a) U.S. Provisional Application No. 60/986,939 entitled "Location Tracking System and User Interface," filed on Nov. 9, 2007, by Andrew Haras, David L. Brown, John J. Giobbi and Fred S. Hirt; and (b) U.S. Provisional Application No. 61/080,916 entitled "Tru-Prox White Paper," filed on Jul. 15, 2008, by John J. Giobbi, the entireties of which are hereby incorporated by reference.

Applicants hereby notify the USPTO that the claims of the present application are different from those of the aforementioned related application. Therefore, Applicant rescinds any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

BACKGROUND

1. Field of Art

The invention generally relates to personal digital keys and corresponding sensors, capable of proximity detection/location determination and auxiliary data services/application services.

2. Description of the Related Art

Proximity sensors and location tracking are technologies with many applications. For example, proximity sensors can be used to provide secure access to physical and/or digital assets, based on biometrics, passwords, PINs, or other types of authentication. Proximity sensors typically have advantages of being less cumbersome, easier to use, and more flexible in form factor and implementation. Proximity sensors can be used to control access to resources and/or to authenticate individuals, for example.

One possible application that can take advantage of proximity sensors is location tracking. RFID tracking is one example. In RFID, RFID tags are attached to objects to be tracked. RFID readers then interact with the RFID tags to determine the location of the tag. Regardless of how it is accomplished, location tracking (i.e., knowledge about the location of an object or person) is generally useful. For example, location tracking information can be used to track inventory and trace the route of objects through various locations. It can be used for time and motion studies. If tags are attached to people, then tracking of people can be used to better understand their behavior. Knowledge about a person's location (and/or their past locations and projected future locations) could be used to provide better services to that person.

However, most proximity systems and location tracking systems have limited capabilities. Typically, the proximity sensor, RFID tag or similar device is a dumb device, in the sense that the device is designed and has the capability only to report its location. For example, such devices typically do not have the capabilities to run different applications or to even interact with different applications. Furthermore, these systems typically are proprietary and narrowly tailored for a specific situation, thus preventing easy expandability to other situations or third party applications.

SUMMARY

Various drawbacks of the prior art are overcome by providing a personal digital key (e.g., which can be carried by a human) that contains a memory having different service blocks. Each service block accessible by a corresponding service block access key. As the personal digital key (PDK) moves around, it is detected by sensors. Each sensor covers an area that will be referred to as a microcell. The microcells are sized based on proximity. For example, if a sensor is used to detect proximity to a specific object, the sensor may be located on or around the object and its microcell adjusted to a size that indicates proximity to the object of interest. The specific size of microcells may vary depending on the object, environment, and specific application. However, microcells typically will be relatively small. For example, diameters in the 1-10 meter range would not be unusual. The sensors report position data (e.g., that the PDK is in the proximity of or within the microcell of a specific sensor), thus enabling location tracking of the PDK. The sensors also provide a data path to various applications. An application that has access to a service block access key can therefore access the corresponding service block on the PDK. The sensors themselves may also contain service block access keys.

In one implementation, a sensor management module (SMM) manages the network of sensors. The sensors are positioned at known locations. Each sensor covers a microcell and communicates wirelessly with PDKs in its microcell, gathering position data about these PDKs. The sensors transmit the position data to the SMM, which generates location tracking data for the PDK based on the position data. The SMM is configured to facilitate communication with one or more applications, and can make the location tracking data available to the applications. In addition, the SMM and the sensor provide a data path between a service block on the PDK and an application that has access to the corresponding service block access key.

As a result, application(s) can interact directly with the PDK. For example, the service blocks on the PDK may contain biometric or other information used for authentication or verification. Alternately, the service blocks may be used as secure local memory for the application. There can be various mappings between the service blocks and the applications; one-to-one mapping is not required. Preferably, different applications can have access to different service block access keys and the sensor and SMM provide a data path between each application and the corresponding service block(s) on the PDK, thus facilitating the use of multiple applications with one PDK.

The sensor itself can also contain a service block access key in order to access the corresponding service block on the PDK. In another aspect, the sensor can also include a biometric input. Other types of security inputs can also be used, for example passwords or PINs.

In one useful scenario, the sensors are located inside a structure and the SMM tracks the location of the PDK within the structure, due to the PDK's proximity to the various sensors. For example, the sensors may be located inside a building, the PDK is sized to be carried by a human, and the SMM tracks the location of the PDK within the building as a proxy for the location of the human. A similar task can be accomplished for outdoor or mixed (indoor/outdoor) sites. For example, guests at an amusement park may be issued PDKs as they enter, with sensors located to indicate proximity to various points of interest. The guests can then be located and/or tracked as they move from one point of interest to the next.

In one architecture, the SMM communicates with applications via an application layer message bus. In another aspect, the system also includes a coordinator module communicatively coupled to the SMM. The coordinator module broadcasts a beacon to the sensors and PDKs. The sensors and PDKs synchronize to the beacon.

In another alternative, a sensor is communicatively coupled to an application. The sensor is capable of communicating wirelessly with a personal digital key (PDK) when the PDK is in range of the sensor. The PDK contains a memory having service blocks. Each service block is accessible by a corresponding service block access key. The sensor provides a data path between a service block on the PDK and an application that has access to the corresponding service block access key.

Other aspects of the invention include systems and components corresponding to the above, and methods corresponding to all of the foregoing.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
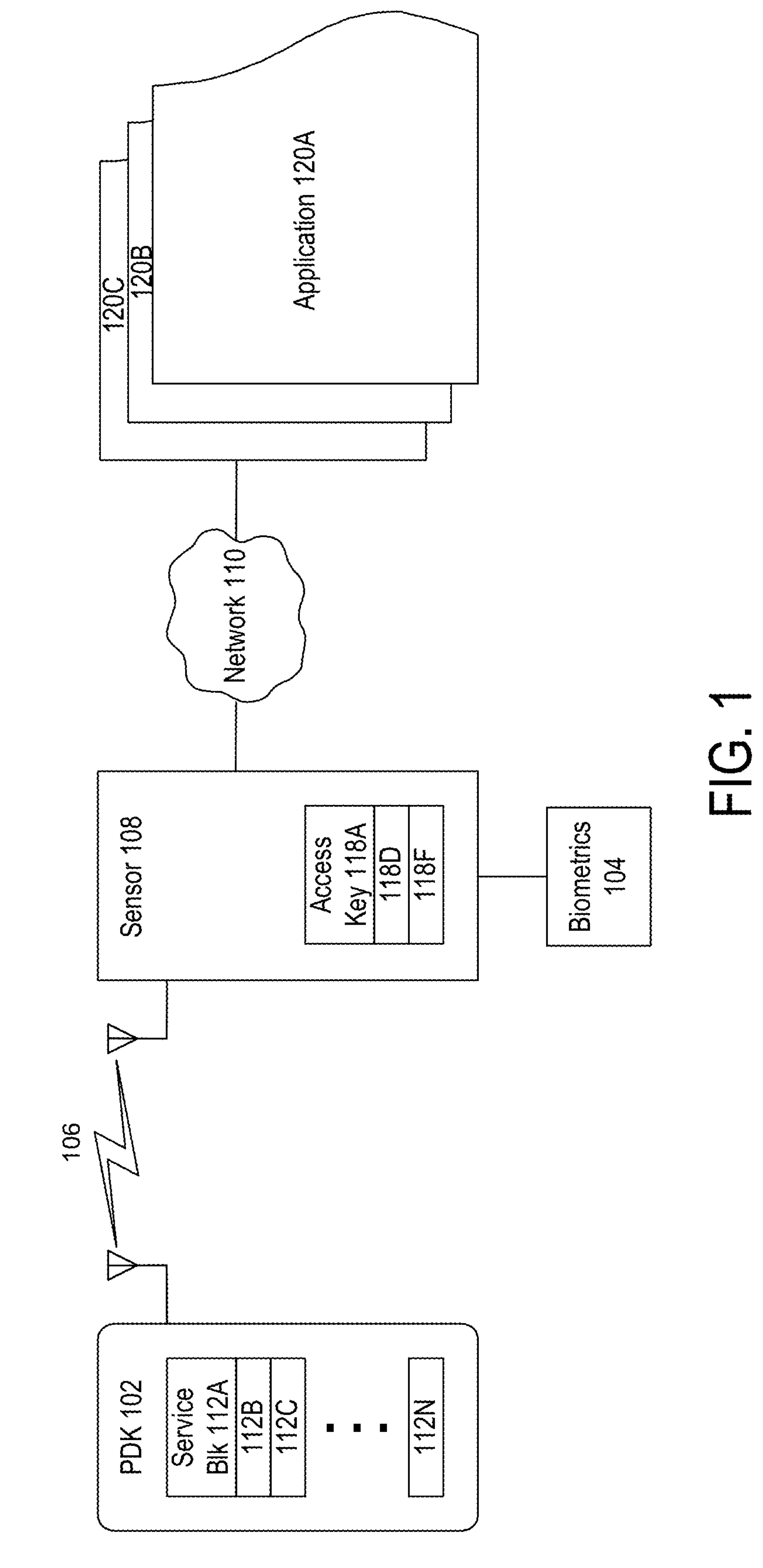
FIG. 1 is a block diagram illustrating one embodiment of a system according to the invention.

FIG. 1 is a high level block diagram illustrating a system for allowing access to multiple applications (or services). The system 100 comprises a Personal Digital Key (PDK) 102, a sensor 108, a network 110 and one or more applications 120 (including services). The sensor 108 is coupled to the PDK 102 by a wireless link 106 and coupled to a network 110 by either a wired or wireless link. In this example, the applications 120 are also accessed over network 110. The sensor 108 is also adapted to receive a biometric input 104 from a user and is capable of displaying status to a user. In alternative embodiments, different or additional resources and databases may be coupled to the network 110, including for example registries and databases used for validation or to check various registrations of the user. In another embodiment, the sensor 108 operates as a standalone device without a connection to the network 110.

Figure 2:
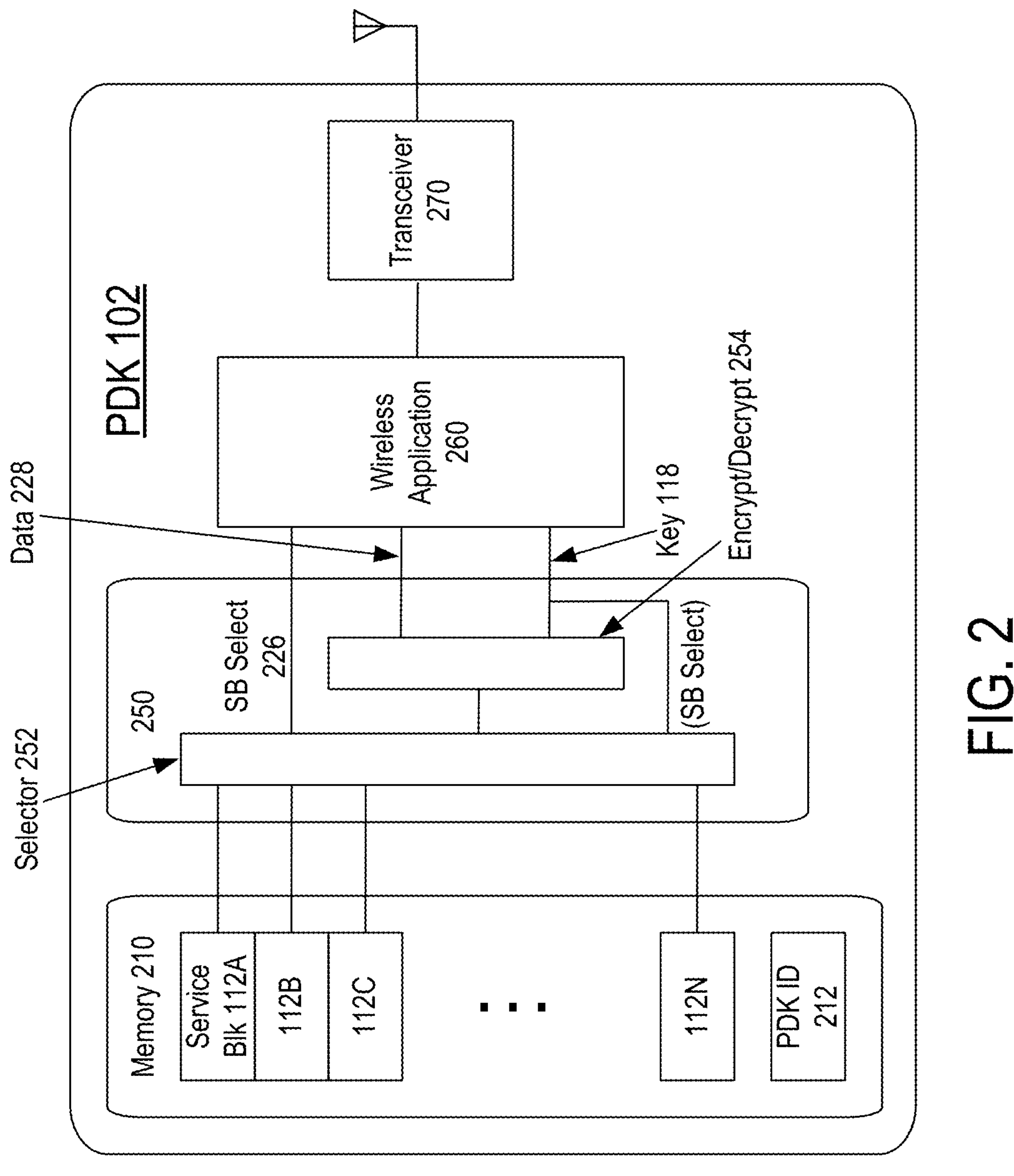
FIG. 2 is a block diagram illustrating one embodiment of a Personal Digital Key (PDK).

The PDK 102 includes multiple service blocks 112A-N as described in more detail in FIG. 2. Each service block 112 is accessed using a corresponding service block access key 118. In this example, the sensor 108 contains three of the service block access keys 118A,D,F. The service block access keys 118 allow the sensor 108 to unlock information stored in the corresponding service blocks 112, which information is used as local secured information.

In one example, a biometric is required in order to access specific service blocks 112 in the PDK 102. Verification of the biometric is achieved by using service block 112A. The sensor 108 stores the corresponding service block access key 118A and uses this key to unlock the biometric service block 112A, which stores a valid biometric. A current biometric is received using biometric input 104. The sensor 108 then verifies the stored biometric (from service block 112A) against the recently acquired biometric (from input 104). Upon proper verification, various applications 120 are permitted to connect to the PDK 102 via the sensor 108 and/or to gain access to other service blocks 112.

The system 100 can be used to address applications 120 where it is important to authenticate an individual for use. Generally, the sensor 108 wirelessly receives information stored in the PDK 102 that uniquely identifies the PDK 102 and the individual carrying the PDK 102. The sensor 108 can also receive a biometric input 104 from the individual. Based on the received information, the sensor 108 determines if access to the application 120 should be granted. In this example, the system 100 provides authentication without the need for PINs or passwords (although PINs and passwords may be used in other implementations). Moreover, personal biometric information need not be stored in any local or remote storage database and is only stored on the user's own PDK (in one embodiment).

The credibility of the system 100 is ensured by the use of a PDK 102 that stores trusted information. The PDK 102 is a compact, portable uniquely identifiable wireless device typically carried by an individual. The PDK 102 stores digital information in a tamper-proof format that uniquely associates the PDK 102 with an individual. Example embodiments of PDKs are described in more detail in U.S. patent application Ser. No. 11/292,330, entitled "Personal Digital Key And Receiver/Decoder Circuit System And Method" filed on Nov. 30, 2005; U.S. patent application Ser. No. 11/620,581 entitled "Wireless Network Synchronization Of Cells And Client Devices On A Network" filed on Jan. 5, 2007; and U.S. patent application Ser. No. 11/620,577 entitled "Dynamic Real-Time Tiered Client Access" filed on Jan. 5, 2007, the entire contents of which are all incorporated herein by reference.

The sensor 108 wirelessly communicates with the PDK 102 when the PDK 102 is within a proximity zone (i.e., within a microcell) of the sensor 108. The proximity zone can be, for example, several meters in radius and preferably can be adjusted dynamically by the sensor 108. Thus, in contrast to many conventional RF ID devices, the sensor 108 can detect and communicate with the PDK 102 without requiring the owner to remove the PDK 102 from his/her pocket, wallet, purse, etc. Generally, the sensor 108 receives uniquely identifying information from the PDK 102 and initiates an authentication process for the individual carrying the PDK 102. In one embodiment, the sensor 108 is adapted to receive a biometric input 104 from the individual. The biometric input 104 comprises a representation of physical or behavioral characteristics unique to the individual. For example, the biometric input 104 can include a fingerprint, a palm print, a retinal scan, an iris scan, a photograph, a signature, a voice sample or any other biometric information such as DNA, RNA or their derivatives that can uniquely identify the individual. The sensor 108 compares the biometric input 104 to information received from the PDK 102 to determine authentication. Alternatively, the biometric input 104 can be obtained by a biometric sensor on the PDK 102 and transmitted to the sensor 108 for authentication. In additional alternative embodiment, some or all of the authentication process can be performed by the PDK 102 instead of the sensor 108.

In this example, the sensor 108 is further communicatively coupled to the network 110 in order to receive and/or transmit information to remote databases for remote authentication. In an alternative embodiment, the sensor 108 includes a non-volatile data storage that can be synchronized with one or more remote databases or registries. Such an embodiment alleviates the need for a continuous connection to the network 110 and allows the sensor 108 to operate in a standalone mode and for the local data storage to be updated when a connection is available. For example, a standalone sensor 108 can periodically download updated registry entries and perform authentication locally without any remote lookup.

In yet another alternative, a standalone sensor 108 may have a pre-configured secure access key 118 and encryption algorithm, or a variable access key 118 that changes, for example based on time and sensor ID. One example application would be a sensor 108 located in a hotel room door, where the sensor could constantly compute a different access key 118 based on time, and the PDK 102 could be associated with this key during the hotel registration process.

The network 110 provides communication between the sensor 108 and various validation databases and/or registries, in addition to the applications 120. In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

In one aspect, the sensor 108 may connect to a validation database that stores additional information that may be used for authorizing a transaction to be processed at the sensor. For example, in purchase transactions, the sensor 108 may interact with a credit card validation database that is separate from the merchant providing the sale. Alternatively, a different database may be used to validate different types of purchasing means such as a debit card, ATM card, or bank account number.

In another aspect, the sensor 108 may connect to various registries that store, among other items, PDK, notary, and/or sensor information. In one embodiment, a registry stores biometric or other types of information in an encoded format that can only be recovered using an algorithm or encoding key stored in the PDK. Information stored in the registries can be accessed by the sensor 108 via the network 110 for use in the authentication process. Two basic types of registries are private registries and a Central Registry. Private registries are generally established and administered by their controlling entities (e.g., a merchant, business authority, or other entity administering authentication). Private registries can be custom configured to meet the specialized and independent needs of each controlling entity. A Central Registry is a highly-secured, centrally-located database administered by a trusted third-party organization. In one embodiment, all PDKs 102 are registered with the Central Registry and may be optionally registered with one or more selected private registries. In alternative embodiments, a different number or different types of registries may be coupled to the network 110.

The service blocks 112 can be used for purposes other than user authentication. For example, information used or produced by an application 120 can be transferred back and forth to the corresponding service block 112. That is, each service block 112 can be used as a local secure memory for the corresponding application 120. Thus, a service 120B may store certain sensitive information in service block 112B, and a separate service 120C will not be able to access that information without the corresponding access key 118B. In this example, the sensor 108 only holds access keys 118A,D,F and does not hold access key 118B. The application 120B may hold the access key 118B, thus allowing it to access service block 112B but preventing application 120C from accessing the service block 112B. Note that this implementation would also prevent the sensor 108 acting alone from accessing the service block 112B.

Turning now to FIG. 2, an example embodiment of a PDK 102 is illustrated. The PDK 102 comprises a memory 210, control logic 250, wireless application 260 and a transceiver 270. The PDK 102 can be standalone as a portable, physical device or can be integrated into commonly carried items. For example, a PDK 102 can be integrated into a portable electronic device such as a cell phone, Personal Digital Assistant (PDA), or GPS unit, an employee identification tag, clothing, or jewelry items such as watches, rings, necklaces or bracelets. In one embodiment, the PDK 102 can be, for example, about the size of a Subscriber Identity Module (SIM) card and be as small as a square inch in area or less. In another embodiment, the PDK 102 can be easily contained in a pocket, on a keychain, or in a wallet. The PDK can also contain other components not shown, for example various other inputs, outputs and/or interfaces (serial or parallel).

The memory 210 can be a read-only memory, a once-programmable memory, a read/write memory or any combination of memory types, including physical access secured and tamperproof memories. The memory 210 typically stores a unique PDK ID 212. The PDK ID 212 comprises a public section and a private section of information, each of which can be used for identification and authentication. In one embodiment, the PDK ID 212 is stored in a read-only format that cannot be changed subsequent to manufacture. The PDK ID 212 is used as an identifying feature of a PDK 102 and distinguishes between PDKs 102 in private or Central registry entries. In an alternative embodiment, the registries can identify a PDK 102 by a different ID than the PDK ID 212 stored in the PDK 102, or may use both the PDK ID 212 and the different ID in conjunction. The PDK ID 212 can also be used in basic PDK authentication to ensure that the PDK 102 is a valid device.

The memory 210 also stores the various service blocks 112A-N. Whether a particular service block 112 is stored in volatile or non-volatile memory may be determined by the specific application. In one approach, the original issuer of the PDK defines how the internal memory 210 may be used for service blocks 112. In some cases, the issuer may choose to only allow their service blocks to be stored, in which case third party applications will not be able to store service blocks in memory 210. In other cases, the issuer may allow any third party service 120 to use available service blocks 112. If a new service block is created, then memory for that service block is allocated. The specific location of the service block and generation of the corresponding service block access key can be handled by the PDK 102, or can be handled via an external service.

Regardless of how created, once created, external applications (such as applications 120 in FIG. 1) can gain access to a specific service block 112 by proving the corresponding access key 118. In FIG. 2, this is shown conceptually by control logic 250. The wireless application 260 on the PDK 102 communicates to the sensor (not shown in FIG. 2) via transceiver 270. The wireless application provides a service block select 226 and a service block access key 118 in order to store, retrieve and/or modify data in a service block 112. The selector 252 selects a service block 112 based on the select signal 226 and the access key 118. The encryption engine 254 encrypts/decrypts data 228 flowing to/from the service block 112 based on the access key 118 (or some other key generated based on the access key, for example a session key). In an alternate method, the service block 112 may be selected based on the service block access key 118, eliminating the need for a separate select signal 226.

The PDK 102 may also include other data and applications. For example, the PDK 102 typically will include various profiles. Many different types of profiles are possible. A biometric profile, for example, includes profile data representing physical and/or behavioral information that can uniquely identify the PDK owner. A PDK 102 can store multiple biometric profiles, each comprising a different type of biometric information. The same biometric information can also be stored multiple times in a PDK 102. For example, two different applications may use the right index fingerprint, and that biometric information may be stored in two different service blocks, one for each application. In addition, the PDK 102 may also store one or more biometric profile "samples" associated with each biometric profile. Profiles may also store one or more PINs or passwords associated with the PDK owner, or one or more pictures of the PDK owner. A profile can further include personal identification information such as name, address, phone number, etc., bank information, credit/debit card information, or membership information. This information can be useful for transactions.

The transceiver 270 is a wireless transmitter and receiver for wirelessly communicating with a sensor 108 or other wireless device. The transceiver 270 can send and receive data as modulated electromagnetic signals. Moreover, the data can be encrypted by the transceiver 270 and transmitted over a secure link. Further, the transceiver 270 can actively send connection requests, or can passively detect connection requests from another wireless source. In one embodiment, the transceiver 270 is adapted to communicate over a range of up to around 5 meters. In another embodiment, the transceiver 270 range can be varied.

Figure 3:
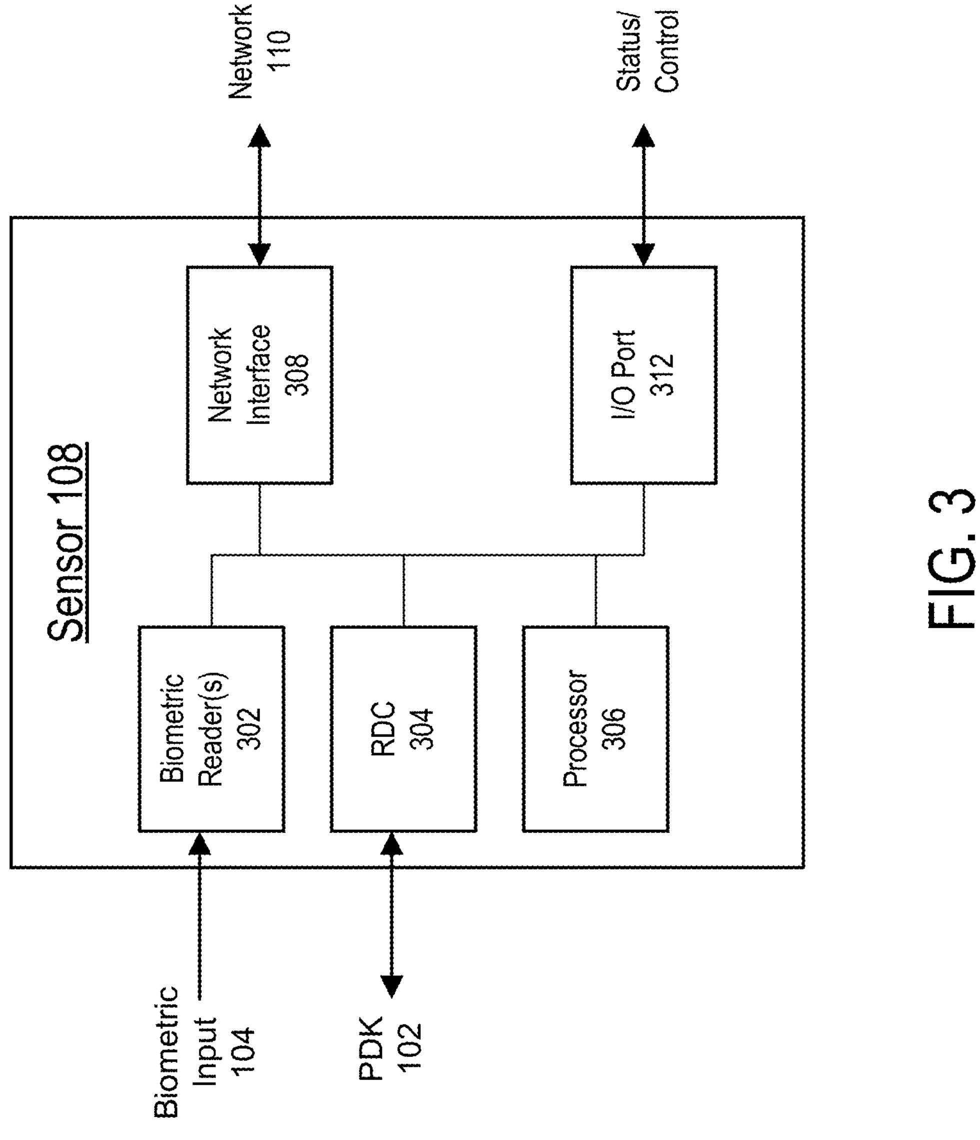
FIG. 3 is a block diagram illustrating one embodiment of a sensor.

Turning now to FIG. 3, an example embodiment of a sensor 108 is illustrated. The embodiment includes one or more biometric readers 302, a receiver-decoder circuit (RDC) 304, a processor 306, a network interface 308 and an I/O port 312. In alternative embodiments, different or additional modules can be included in the sensor 108.

The RDC 304 provides the wireless interface to the PDK 102. Generally, the RDC 304 wirelessly receives data from the PDK 102 in an encrypted format and decodes the encrypted data for processing by the processor 306. An example embodiment of an RDC is described in U.S. patent application Ser. No. 11/292,330 entitled "Personal Digital Key And Receiver/Decoder Circuit System And Method," the entire contents of which are incorporated herein by reference. Encrypting data transmitted between the PDK 102 and sensor 108 minimizes the possibility of eavesdropping or other fraudulent activity. In one embodiment, the RDC 304 is also configured to transmit and receive certain types of information in an unencrypted, or public, format.

The biometric reader 302 receives and processes the biometric input 104 from an individual. In one embodiment, the biometric reader 302 is a fingerprint scanner. Other embodiments of biometric readers 302 include retinal scanners, iris scanners, facial scanner, palm scanners, DNA/RNA analyzers, signature analyzers, cameras, microphones, and voice analyzers. Furthermore, the sensor 108 can include multiple biometric readers 302 of different types.

The network interface 308 can be a wired or wireless communication link between the sensor 108 and network 110. For example, in one type of authentication, information is received from the PDK 102 at the RDC 304, processed by the processor 306, and transmitted to external authentication databases through the network interface 308. The network interface 308 can also receive data sent through the network 110 for local processing by the sensor 108. In one embodiment, the network interface 308 provides a connection to a remote system administrator to configure the sensor 108 according to various control settings.

The I/O port 312 provides a general input and output interface to the sensor 108. The I/O port 312 may be coupled to any variety of input devices to receive inputs such as a numerical or alphabetic input from a keypad, control settings, menu selections, confirmations, and so on. Outputs can include, for example, status LEDs, an LCD, or other display that provides instructions, menus or control options to a user.

Figure 4:
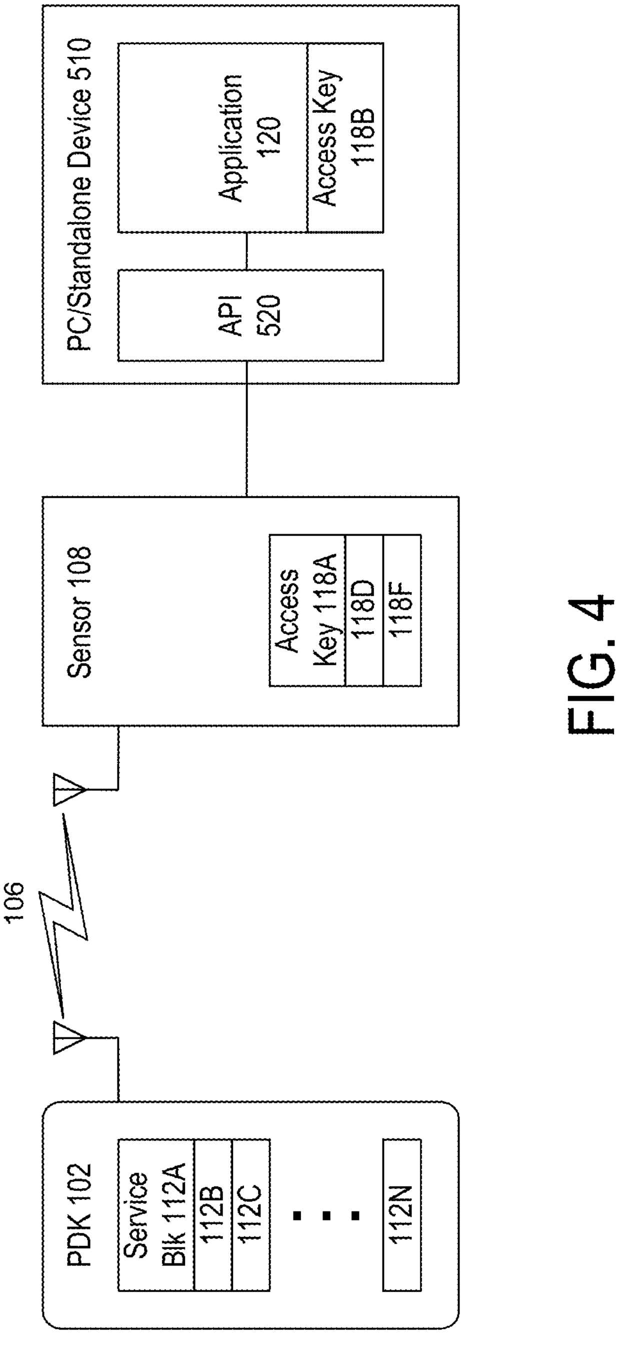
FIGS. 4-6 are block diagrams illustrating further embodiments of systems according to the invention.
Figure 5:
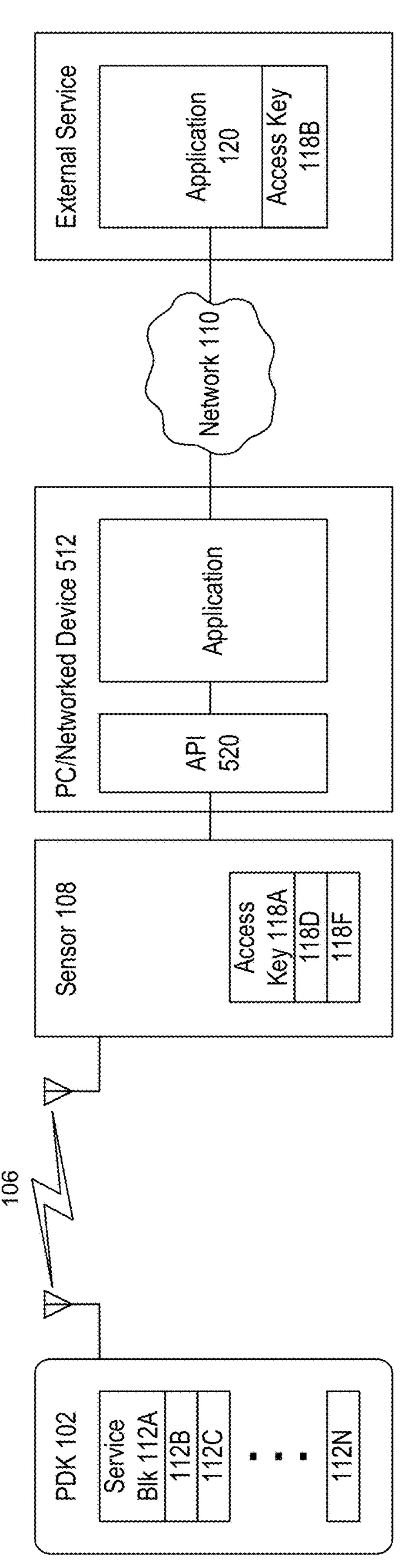
Figure 6:
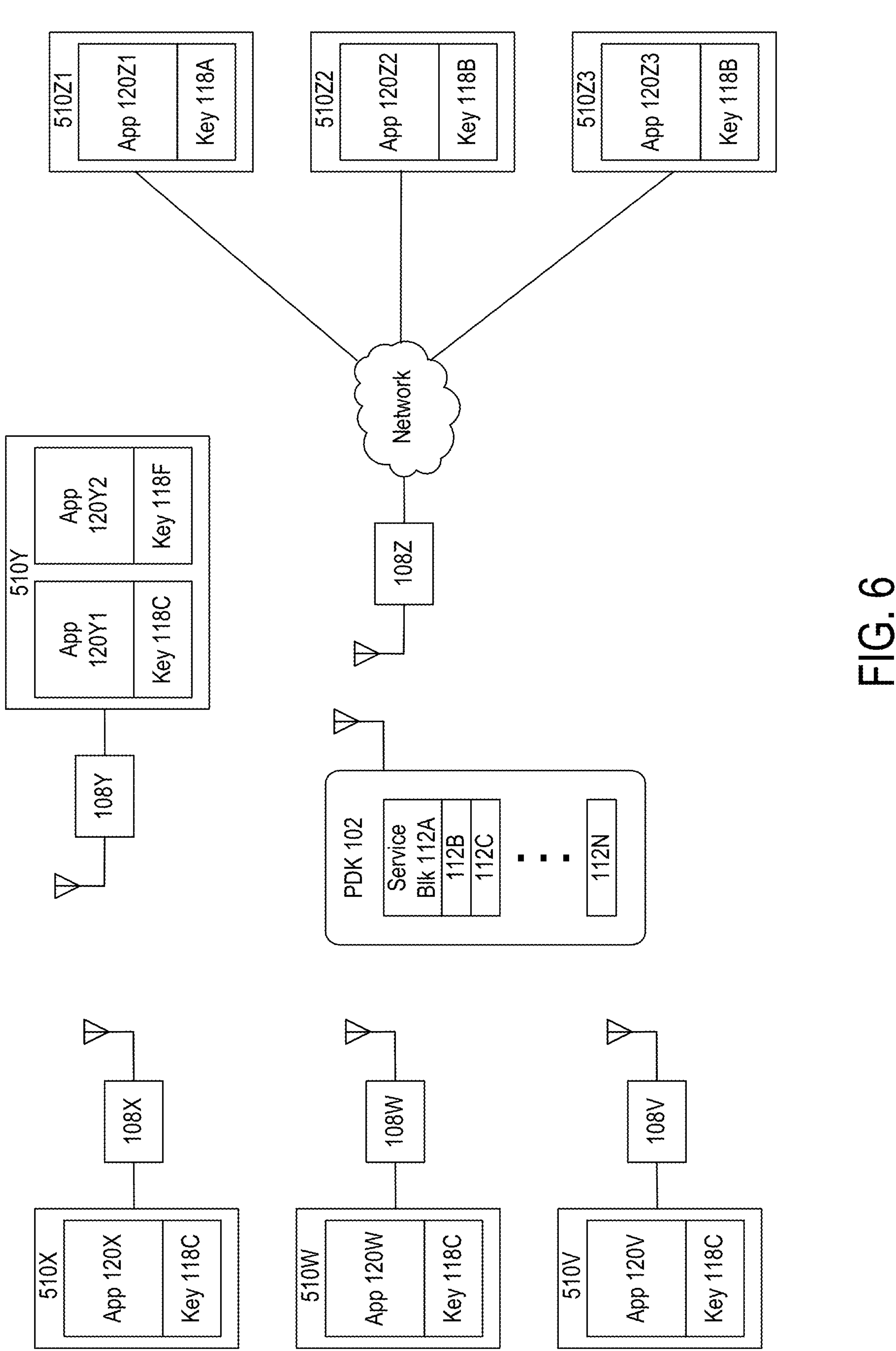

FIGS. 4-6 are high level block diagrams illustrating additional examples of applications accessing service blocks. FIGS. 4 and 5 illustrate that the application 120 need not be located at any particular location on the network. Rather, the service block 112 is accessed from any application 120 that can attach (in a network sense) to the sensor 108.

In FIG. 4, the sensor 108 attaches to the PDK 102 within its microcell, using service block access key 118(A) and service block 112(A). A personal computer or other standalone device 510 is attached to the sensor 108, either directly or via a network. In this example, the device 510 communicates with the sensor via a standardized API 520. An application 120 executes on the device 510 and has access to the service block access key 118(B). It uses this key to gain access to the corresponding service block 112(B). This is an example of a local application 120.

FIG. 5 illustrates a remote application. In this example, the sensor 108 attaches to the PDK 102 in the same manner as FIG. 4, using service block access key 118A and service block 112A. However, application 120 is not executing on a local device. Rather, it executes remotely. Here, it is shown as an external service 120. However, service 120 can still gain access to service block 112B by use of service block access key 118B, although it does so via network 110 and intermediate device 512. Although the sensor 108 is the device that attaches to the PDK 102, a local or remote application 120 with the right credentials may store or retrieve information in a service block 112 in the PDK 102.

The PDK itself can also be configured to prevent the same source from repeating invalid access attempts to the PDK's service blocks. The PDK may monitor access to the service blocks. When an attached service makes multiple unsuccessful attempts to unlock a service block, the PDK tracks this and eventually ignores the requests from that service for a period of time. Alternately, the PDK may disconnect from the network or take other actions.

An example of a local application (FIG. 4) is an auto login/logoff of a personal computer. When a PDK 102 is within the proximity of the personal computer 510, the PDK 102 is detected and the sensor 108 attaches to the PDK 102 (using service block 112A). The login/logoff application 120 then sends the service block access key 118B along with a request for the contents of the service block 112B to the PDK 102 via the sensor 108. For example, a standard may specify that particular service block 112B contains username and password. These are returned to the application 120, allowing automatic login to the personal computer 510.

An example of a remote application (FIG. 5) is a credit card transaction. The sensor 108 in this case could be a credit card terminal. When the PDK 102 is brought in close proximity, the credit card terminal 108 attaches to the PDK 102 (using service block 112A). The terminal 108 then sends the PDK ID 212 to the credit card issuer (the external service) for identification. The credit card issuer may then send a service block access key 118B back to the sensor 108, where it is passed on to the PDK 102 to unlock a specific service block 112B. The contents of the service block 112B could then be sent back to the credit card issuer where further decryption could occur and the credit card holder could be verified. Once verified, the credit card terminal displays that the transaction is approved.

These two examples illustrate basic concepts of the capabilities of the service blocks and how an application (service) may use them. Since service blocks preferably are both readable and writable, services may use them as they see fit (i.e. debit, username/password, credit card information, etc.). In some sense, the service block acts as a secure local memory on the PDK.

FIGS. 4 and 5 illustrate a basic case where a single application accesses a single service block on a single PDK via a single sensor. The invention is not limited to this case. FIG. 6 illustrates a case with multiple applications, sensors, and service blocks. This illustrates the sharing of service blocks. As shown, service blocks may be limited to a single service or source or may be shared across multiple services and sources. A service block 112 is a protected memory element which allows an application 120 with the right credentials to access it. In this example, applications 120W, 120X and 120Y1 can each access service block 112C since each application has access to service block access key 118C. Similarly, applications 120V, 120Z2 and 120Z3 can each access service block 112B. Although not shown in FIG. 6, it is also possible for an application to access more than one service block. FIG. 6 also shows a situation where applications 120Z1-3 running on different devices 510Z1-3 all access the PDK 102 through the same sensor 108Z. Each sensor 108 covers a certain proximity zone (i.e., microcell). The presence of the PDK 102 within a microcell indicates proximity of the PDK to that particular sensor.

Also shown is a device 510Y with two applications 120Y1 and 120Y2, each of which accesses a different service block. In some cases, the first application 120Y1 is enabled from a first service block 112C, thus allowing a second application 120Y2 to operate using a second service block 112F (although the two applications need not be on the same device 510). For example, the first application 120Y1 might be the auto login/logoff, where a user logs in to a personal computer via a service block 112C that provides a username and password. Now that the user is logged in, the user wishes to attach to his credit card company. The user types in the web address of the credit card provider, where the credit card provider requests the user's credentials. First, the user may have to provide some live biometric information. Application 120Y2 compares this against a biometric stored in a second service block 112F on the PDK. After the sensor 108Y verifies the correct biometrics, the sensor indicates to the PDK that external services may now access their service blocks. The credit card provider 120Z1 then sends its service block access key 118A to the PDK where this third service block 112A is retrieved and sent back to the credit card issuer. The credit card issuer then verifies the data and authorizes the user's transaction.

Furthermore, although the above scenarios focus mostly on service blocks in the PDK, applications may also use the basic authentication function that allows the PDK and sensor to verify each other. In this scenario, once the sensor and PDK finish their verification the application is signaled. The application may then use this information as an assurance that the PDK is a legitimate device (but not necessarily that the holder of the device is legitimate).

In certain cases, access to a service block 112 may allow the application 120 to access various input/outputs on the PDK. For example, the PDK may have several inputs and/or outputs, as well as a serial (or other) interface. The inputs may be either transition triggered or level triggered. An example of a transition triggered event might be a button press, where level triggered might be turning a switch on. Multiple outputs may also exist where they may also be pulsed or level outputs. Finally an interface may allow attachment of an external device, which may then send data through the PDK to the application. In many cases, the inputs and outputs may be simple push button switches and LEDs used to allow a user to interact with an application.

Since the number of applications is limitless, different applications may use the inputs and outputs for different functionality. For example, a user walking into a casino may require attention from a service representative and if the casino has enabled button 1 for this functionality, when the user depresses button 1, an attendant is alerted with information related to the user and the location of the user. In a different application, an actual button may not exist, but it may be tied to an output of another device indicating when a piece of equipment was in use. Whenever the device was in use, the PDK transmits the input 1 active alert back to the backend application. The backend application may then be using this information to determine when the equipment must be recalibrated based on its usage.

This is also true for outputs and any interfaces. Outputs may be used to turn on a light or sound an audible tone used to locate an asset in a building. For example, there may be 20 pieces of equipment in a room which all show up using a location tracking program, but the user would then have to sift through each piece of equipment until the right one is located. Using an output as described above, a light could be lit and the equipment could be immediately located within the room. The interface allows another attached application to the PDK to send information to an end application attached to the sensor. In this case the sensor provides a medium to push data to an external source.

Figure 7:
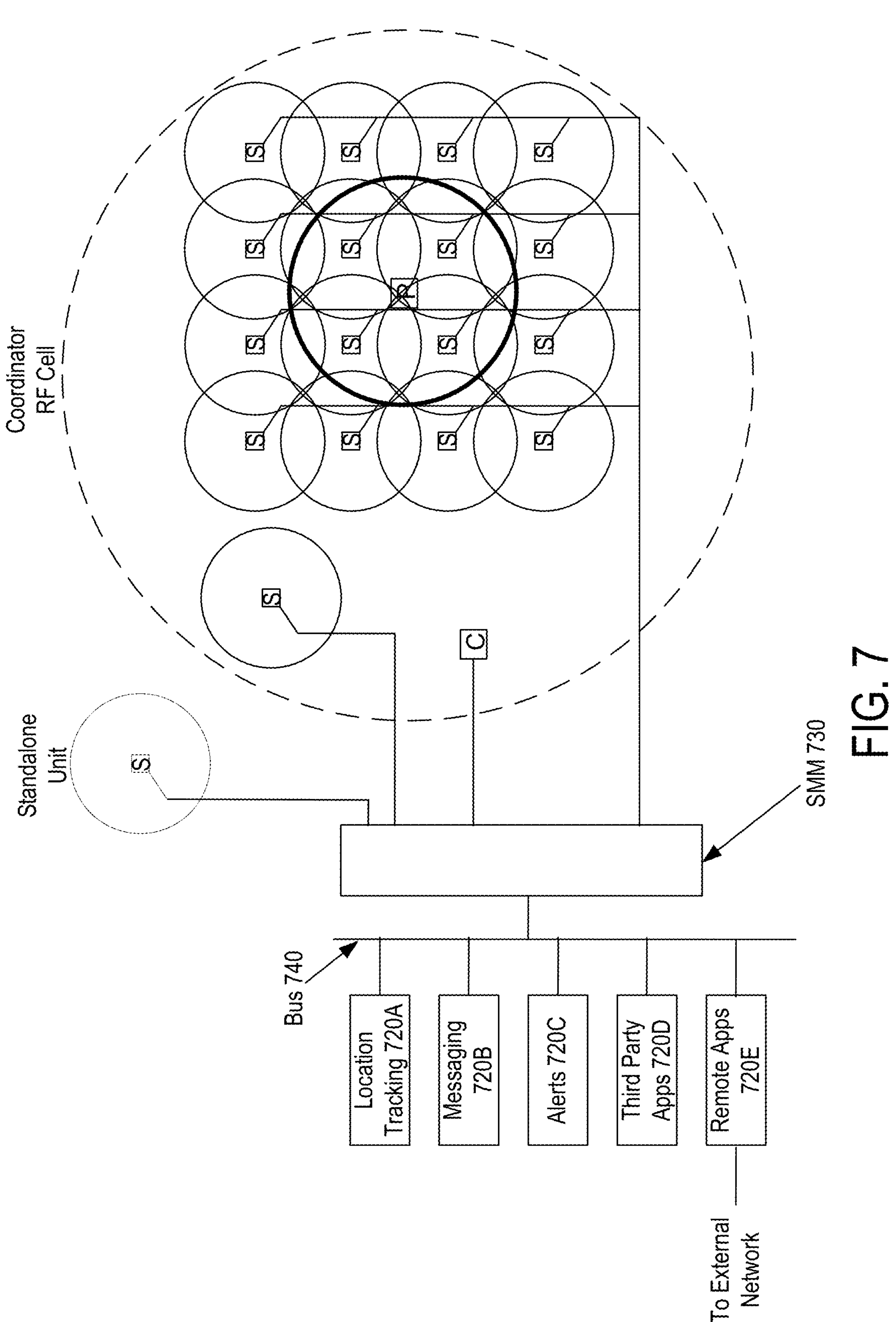
FIG. 7 is a block diagram illustrating one embodiment of a system with networked sensors.

FIG. 7 is a high level block diagram illustrating one embodiment of a system with networked sensors. In this example, multiple sensors (marked "S") are attached to a Sensor Management Module (SMM) 730. The SMM 730 provides data routing for the sensors (e.g., to and from applications 720A-E). In this example, the SMM 730 also receives data from the sensors and processes this data to provide location tracking of PDKs (marked "P") that are within the sensor field. In this implementation, the system also includes an application layer message bus 740, over which the SMM 730 and applications 720 can exchange messages. This allows multiple applications 720 to simultaneously communicate with PDKs and make use of the location tracking of the PDKs. The application layer message bus 740 may also be extended to other applications via a remote application interface.

In FIG. 7, each sensor's microcell (i.e., proximity zone) is denoted by a circle around the sensor. Similarly, the PDK's range is shown by the heavy larger circle. In the example shown, the PDK is in range of four different sensor zones and any of the four sensors may establish communications to the PDK. Using a network topology as shown, the SMM may instruct a specific sensor to attach to the PDK. Once established, the communication link will allow the PDK to communicate with various applications 720, in this example via the SMM 730 and bus 740. Applications 720 will be able to access service blocks on the PDK through the use of service block access keys, as described above.

In addition, in this example, the sensors are at known locations, preferably at fixed locations. For example, sensors may be distributed throughout a building or other structure or site (including outdoors). The sensors interact with the PDK in a manner that allows the sensors to gather position data about the PDK. This position data is sent by the sensors to the SMM 730, which processes the data to determine the PDK's position and to provide location tracking of the PDK over time. The position and/or location tracking information can then be made available to applications 720 via bus 740, in addition to allowing the applications 720 to communicate with the PDK.

Location tracking of the PDK by the sensor network can be achieved in different ways, one of which will be described below. The example in FIG. 7 uses a coordination module (marked "C") or simply coordinator, although this is not required in other implementations. The large dashed circle shows the coordinator's cell. In this example, the sensors preferably contain two transceivers, one to communicate with the coordinator on what will be referred to as the control channel and another to communicate with the PDK on what will be referred to as the traffic channel.

Figure 8:
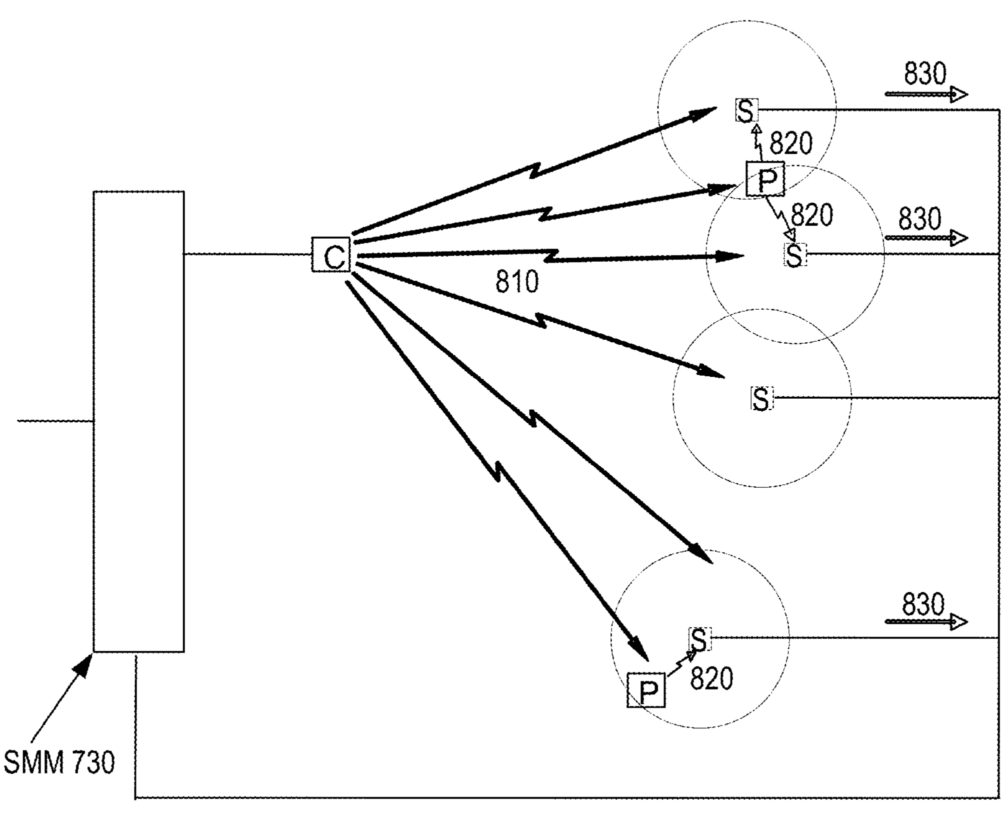
FIGS. 8-9 are block diagrams illustrating operation of the system in FIG. 7.

FIG. 8 illustrates operation of the system in FIG. 7. The coordinator C broadcasts 810 a periodic beacon on a control channel. The sensors and PDKs synchronize to this periodic beacon. On the control channel, when a sensor is not receiving the broadcasted beacon, it is timesharing between listening for a PDK ALOHA response and possibly sending a command to a specific PDK. The PDK, after detecting the beacon, remains on the control channel and continues to periodically wake up, receive the beacon, and realign its timing. By using system related information found in the beacon and its own serial number, the PDK calculates the wakeup time to synchronize to the beacon and broadcast 820 an ALOHA response. As shown, the PDK's broadcasted ALOHA response may overlap several sensors causing multiple sensors to receive the information simultaneously. Each sensor that receives an ALOHA response from a PDK performs a store and forward 830 of the responses to the SMM 730 on a periodic basis.

The coordinator and sensors communicate to the SMM 730 via a backend network. This communications method used to attach each device to the SMM may be wired or wireless provided it has the bandwidth required to transport the information between the devices. When a PDK ALOHA response is detected by a sensor, the sensor collects information such as the PDK ID, receiver signal strength indication, and timestamp. After receiving this information from the sensors, the SMM independently applies the new information for each PDK from the sensors, to the previous history of that PDK and through location deterministic algorithms computes the most likely sensor microcell in which the PDK is located. There are multiple known algorithms for doing so. In one approach, location (proximity) is determined based on prior location history, time at the current location, RF signal strength and geographic contours. The SMM may also store the raw data for further alternate processing methods or for diagnostic purposes.

The SMM 730 can broadcast this information on the application layer messaging bus 740 for applications 720 to use. For example, one application 720A might be a location tracking application with a graphical user interface that shows the current position or trail of the PDK. The SMM 730 (or applications 720) may also store the location information and make it available on an on-demand basis.

In this particular example, access is allocated using a time division multiple access (TMDA) system, where an RF logical channel is distributed over time and each device has a specific period known as a timeslot in which they are allowed to respond. Each timeslot has a preamble and timeslot synchronization character followed by a packet, and lastly a guard period. The content of each packet is dependent on the source device, channel type (control or traffic), and timeslot location.

For example, the coordinator broadcasts the beacon on a period basis. All sensors and PDKs receive the beacon. Each PDK then broadcasts its ALOHA response at a specific timeslot allocated for that purpose. In addition to the handshake messages that occur on the control channel, the beacon and ALOHA response may also carry auxiliary data. This data may be in the form of an alarm indication, command/status, or user/application data, for example. It could be provided by an end application, SMM network command, external device interface (such as a terminal interface), or via an internal alarm functions such as low battery, input signal change, or setting an output signal polarity.

After an ALOHA response is broadcast from a PDK, the PDK listens for a command from nearby sensors. Based on the type of PDK and time it is present in one geographical location, one or more nearby sensors that detected the ALOHA response, may also send additional paging or auxiliary data in the sensor command response timeslot for a specific PDK.

Other timeslots can be allocated to traffic channels and/or to other messages over the control channel. Various TDMA approaches can be used to allocate the wireless communications channel. Non-TDMA approaches can also be used.

The sensor network system of FIG. 7 provides a closed loop system. With the SMM 730 being the central hub, broadcasting auxiliary data through the coordinator (and sometimes sensor devices) and collecting PDK auxiliary data through the sensors, it is possible to determine if in an asymmetrical system a command was successfully completed.

Figure 9:
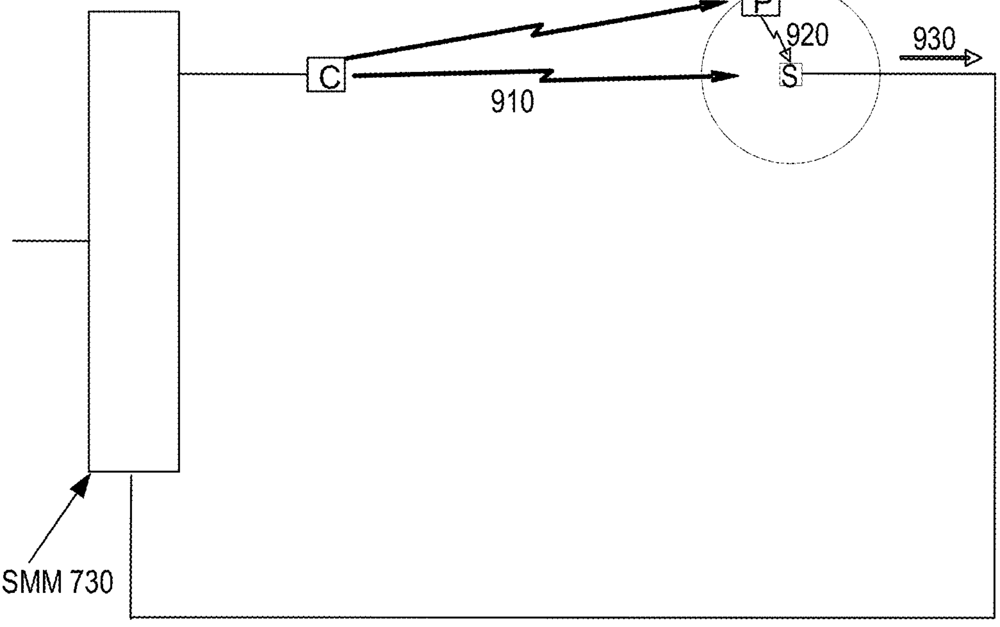

FIG. 9 illustrates an example of how the closed loop system works. In step 910, the SMM 730 (via the coordinator) broadcasts a beacon that also contains auxiliary information. This auxiliary information contains a command from an application 720 to be executed by the PDK. Assume that, for this particular command, the PDK is expected to acknowledge execution of the command. After the PDK executes the command, the PDK sends 920 the acknowledge message as auxiliary data in one of the PDK's ALOHA responses. The sensor receives the ALOHA response and passes 930 the information back to the SMM 730. The SMM 730 has now verified that the command was successfully executed. Such commands could be as simple as set an output to turn on a light or generate an audible sound. It is also possible that an application 720 attached to the SMM 730 may request to pass data to the specific PDK where that data may then be passed to an external terminal application where the system acts only as a transport mechanism. In this mode, the applications attached at each end would be responsible for verifying and acknowledging the data was sent and received successfully.

Figure 10:
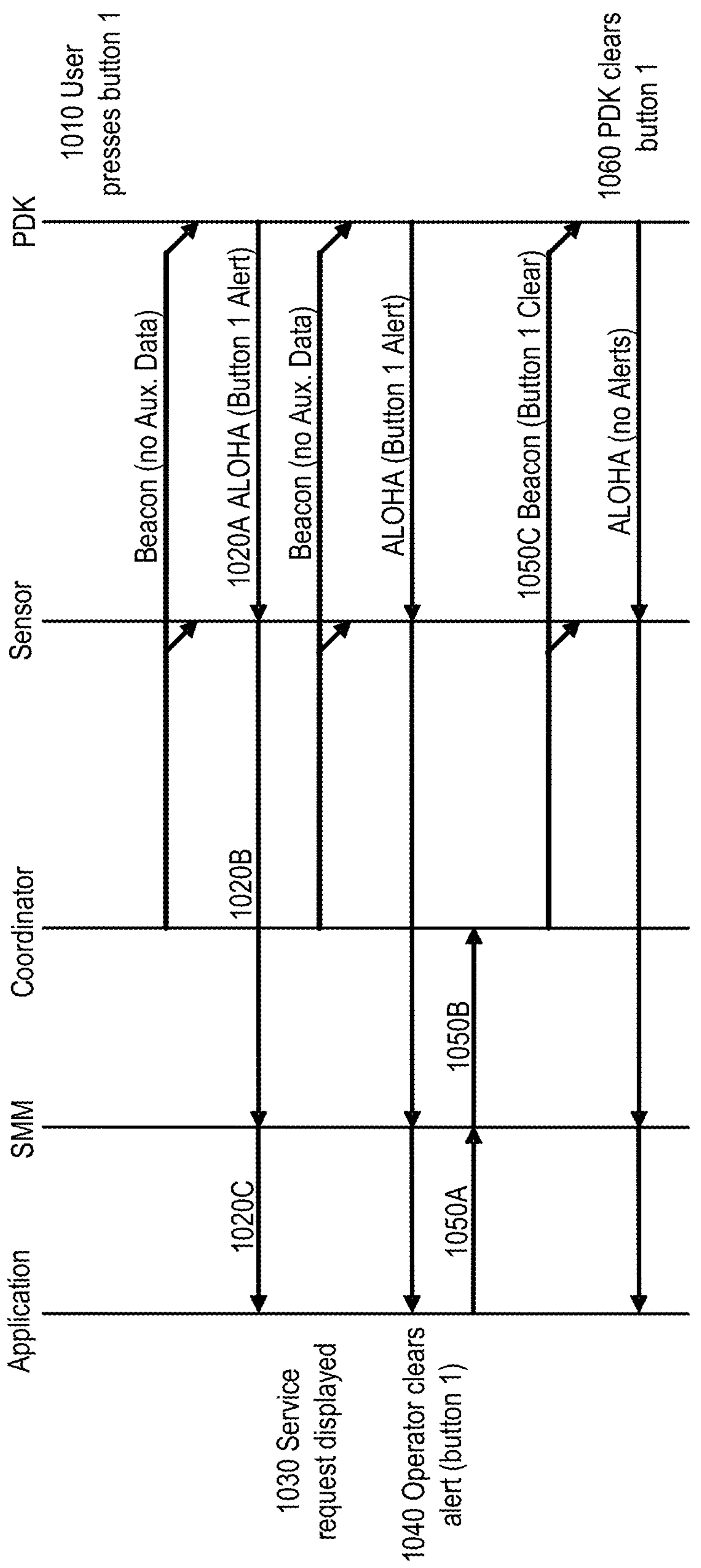
FIG. 10 is a diagram illustrating operation of the system in FIG. 7.

A second example is shown in FIG. 10, where the PDK initiates an alert. The coordinator periodically transmits a beacon and the PDK periodically returns an ALOHA response. In the example, a user carrying a PDK is located within a service oriented business, such as a department store, casino, restaurant, etc. The user desires to talk with a service representative from the organization and depresses 1010 the service button on their PDK (button 1). The next time the PDK wakes up to send an ALOHA response, the PDK attaches the button 1 alert to the ALOHA messages and broadcasts 1020A it. A local sensor receives the location response containing the button 1 alert and eventually sends 1020B the received ALOHA responses back to the SMM. The SMM may reformat the data and passes 1020C the indication back to the application. The application then indicates 1030 a button 1 request from the particular PDK serial number (and other related user information) on the application console. The PDK continues to send back the button 1 alert until cleared or a timeout period occurs. This allows devices that have inadequate coverage (e.g., on the edge of a cell boundary) to continue to send the alert until detected.

Eventually the console operator becomes aware of the service request and dispatches a representative to the user and clears 1040 the button alert on the console. The clear button 1 alert is then sent 1050A-B to the coordinator where it is queued to go out 1050C on the proper beacon when the PDK will be awake. Once the PDK wakes up and receives 1050C its next beacon, the PDK clears out 1060 the button 1 alert indicator and returns to a basic ALOHA state with no auxiliary data pending.

The example shown may have also had a visible indicator in the PDK where the visible indicator may have become lit when the button was depressed. Once the button 1 alert was cleared the indicator would be unlit.

In this example, neither the application nor SMM verified the PDK actually received the clear button 1 alert. In one approach, each auxiliary message (page, alert, etc.) sent by a device contains a sequence number. If a device continues to send the information after it is acknowledged or cleared, the device is aware of the condition because of the sequence number. Any time a new auxiliary message is sent, the sequence number is incremented to alleviate the confusion as to how new or old any message is.

For some systems, redundancy is important. Redundancy can be implemented in the example system of FIG. 7 in a number of ways. For example, it is possible to provide multiple coordinators where these coordinators can be used to extend a coverage area or as a redundant backup. In one approach, each coordinator broadcasts its beacon on the same RF channel with a slight timing offset from the other coordinators. This creates a simulcast system where if one coordinator fails, the second coordinator can still resume system operation. This may also counter the issues of multipath by providing spatial diversity with the coordinators. Another redundancy measure is that information can be sent to PDK via the sensors, in addition to or in place of the coordinator. Another example of redundancy is that multiple sensor may receive messages from the PDK so there may be multiple paths back to the SMM via different sensors.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalent.

The invention claimed is:

1. A method comprising:

detecting a personal digital key within a proximity zone of a sensor device, the personal digital key containing a secure memory uniquely segmented into a plurality of different service blocks, each service block unique to a corresponding one of a plurality of different applications and individually accessible only upon presentation of a corresponding unique access key;

responsive to detecting the personal digital key within the proximity zone, wirelessly communicate with the personal digital key, a message to enable use of the corresponding unique access key with a corresponding service block of the plurality of different service blocks, the corresponding unique access key configured to enable a particular application from the plurality of different applications to access the corresponding service block in the personal digital key via the sensor device;

authenticating the particular application prior to enabling access to the corresponding service block; and providing, by the sensor device, subsequent to successful authentication, a dedicated data path between an accessed service block and the particular application subsequent to authentication to facilitate direct interaction.

2. The method of claim 1, wherein responsive to wirelessly communicating the corresponding unique access key to the personal digital key, gathering position data about the personal digital key and transmitting the position data to a sensor-management module managing a network of sensor devices.

3. The method of claim 2, wherein gathering the position data about an asset using the personal digital key includes at least one of collecting a personal digital key identifier, a signal strength indication, and a timestamp.

4. The method of claim 1, wherein for an asset associated with the personal digital key, the asset being at least one of a digital asset and a physical asset, using the personal digital key to generate location tracking data based on position data and generating the location tracking data for the asset based on the position data, and further comprising:

determining a prior location history of the personal digital key associated with the asset; and applying the position data and the prior location history of the personal digital key to a location deterministic algorithm.

5. The method of claim 4, further comprising:

responsive to initiating a wireless transmission of a command from the particular application to the personal digital key associated with the asset;

receiving an acknowledgement message of an execution of the command by the personal digital key; and providing the acknowledgement message to the particular application.

6. The method of claim 5, wherein the command includes one from a group of turning on a light on the personal digital key and setting off an audible tone on the personal digital key.

7. The method of claim 5, wherein the execution of the command by the personal digital key is used to locate the asset in at least one of an indoor site and an outdoor site.

8. The method of claim 1, wherein the sensor device provides a data path between the personal digital key associated with an asset and the particular application, wherein the particular application is a credit card transaction application.

9. The method of claim 1, wherein the particular application is a location tracking application.

10. The method of claim 9, wherein the location tracking application uses a graphical user interface to display a trail of the personal digital key associated with an asset.

11. A system comprising:

a sensor device and a memory including instructions that, when executed by the sensor device, cause the system to:

detect a personal digital key within a proximity zone of the sensor device, the personal digital key containing a secure memory uniquely segmented into a plurality of different service blocks, each service block unique to a corresponding one of a plurality of different applications and individually accessible only upon presentation of a corresponding access key;

responsive to detecting the personal digital key within the proximity zone, wirelessly communicate with the personal digital key, a message to enable use of a corresponding access key associated with a corresponding service block of the plurality of different service blocks, the corresponding access key configured to enable a particular application from the plurality of different applications to access the corresponding service block in the personal digital key via the sensor device;

authenticate, by at least one of the sensor device and a server associated with the sensor device, use of the corresponding access key for the particular application prior to enabling the particular application to access the corresponding service block; and provide, by the sensor device, subsequent to successful authentication of the particular application, a communication session as a dedicated data path between an accessed service block and the particular application to facilitate direct interaction, to allow the particular application to store information to, and retrieve information from, an accessed service block, the accessed service block serving as a secure local memory for the particular application.

12. The system of claim 11, wherein responsive to wirelessly communicating the corresponding access key to the personal digital key, gathering position data about the personal digital key and transmitting the position data to a sensor-management module managing a network of sensor devices.

13. The system of claim 12, wherein gathering position data about an asset using the personal digital key includes at least one of collecting a personal digital key identifier, a signal strength indication, and a timestamp.

14. The system of claim 11, wherein for an asset associated with the personal digital key, the asset being at least one of a digital asset and a physical asset, using the personal digital key to generate location tracking data based on position data and generate the location tracking data for the asset based on the position data, and wherein the instructions, when executed by the sensor device, further cause the system to:

determine a prior location history of the personal digital key associated with the asset; and apply the position data and the prior location history of the personal digital key to a location deterministic algorithm.

15. The system of claim 11, wherein the instructions, when executed by the sensor device, further cause the system to:

receive an acknowledgement message of an execution of a command by the personal digital key, responsive to initiating a wireless transmission of the command from the particular application to the personal digital key associated with an asset; and provide the acknowledgement message to the particular application.

16. The system of claim 15, wherein the command includes one from a group of turning on a light on the personal digital key and setting off an audible tone on the personal digital key.

17. The system of claim 15, wherein the execution of the command by the personal digital key is used to locate the asset in at least one of an indoor site and an outdoor site.

18. The system of claim 15, wherein the sensor device provides a data path between the personal digital key associated with the asset and the particular application, wherein the particular application is a credit card transaction application.

19. The system of claim 11, wherein the particular application is a location tracking application.

20. The system of claim 19, wherein the location tracking application uses a graphical user interface to display a current position of the personal digital key associated with an asset.

* * * * *